(12) United States Patent
Howard

(10) Patent No.: US 12,411,671 B1
(45) Date of Patent: Sep. 9, 2025

(54) SOFTWARE SYSTEMS AND METHODS FOR ADVANCED OUTPUT-AFFECTING LINEAR PATHWAYS

(71) Applicant: Kevin D. Howard, Mesa, AZ (US)

(72) Inventor: Kevin D. Howard, Mesa, AZ (US)

( * ) Notice: Subject to any disclaimer, the term of this patent is extended or adjusted under 35 U.S.C. 154(b) by 0 days.

(21) Appl. No.: 19/171,172

(22) Filed: Apr. 4, 2025

(51) Int. Cl.
*G06F 8/40* (2018.01)
*G06F 8/41* (2018.01)

(52) U.S. Cl.
CPC ................... *G06F 8/443* (2013.01)

(58) Field of Classification Search
CPC .................................... G06F 8/443
USPC ........................................ 717/159
See application file for complete search history.

(56) References Cited

U.S. PATENT DOCUMENTS

| | | |
|---|---|---|
| 7,133,950 B2 | 11/2006 | Olukotun |
| 9,851,949 B2 | 12/2017 | Howard |
| 10,496,514 B2 | 12/2019 | Howard |
| 11,194,575 B2 | 12/2021 | Karve et al. |
| 11,520,560 B2 | 12/2022 | Howard |
| 11,687,328 B2 | 6/2023 | Smith et al. |
| 11,789,698 B2 | 10/2023 | Howard |
| 11,861,336 B2 | 1/2024 | Smith et al. |
| 12,099,446 B2 | 9/2024 | Howard |
| 12,147,781 B2 | 11/2024 | Howard |
| 2008/0082933 A1 | 4/2008 | Howard et al. |
| 2009/0055625 A1 | 2/2009 | Howard et al. |
| 2010/0049941 A1 | 2/2010 | Howard |
| 2010/0183028 A1 | 7/2010 | Howard et al. |
| 2010/0251259 A1 | 9/2010 | Howard |
| 2010/0325388 A1 | 12/2010 | Howard |
| 2012/0036399 A1 | 2/2012 | Howard |
| 2012/0066664 A1 | 3/2012 | Howard |
| 2012/0101929 A1 | 4/2012 | Howard |
| 2013/0254751 A1 | 9/2013 | Howard |
| 2013/0332903 A1 | 12/2013 | Howard |
| 2013/0332904 A1 | 12/2013 | Howard |
| 2013/0346807 A1 | 12/2013 | Howard |
| 2014/0125683 A1 | 5/2014 | Howard |
| 2014/0282412 A1 | 9/2014 | Howard et al. |
| 2014/0298286 A1 | 10/2014 | Howard |
| 2014/0304684 A1 | 10/2014 | Howard |
| 2014/0310684 A1 | 10/2014 | Howard |

(Continued)

FOREIGN PATENT DOCUMENTS

| | | |
|---|---|---|
| CN | 103874998 B | 2/2017 |
| WO | 2003060748 A2 | 7/2003 |

(Continued)

*Primary Examiner* — Hanh Thi-Minh Bui
(74) *Attorney, Agent, or Firm* — Skaar Ulbrich Macari, P.A.

(57) ABSTRACT

Unlike conventional or otherwise known decomposition methods like standard functional decomposition, time-affecting linear pathway (TALP) decomposition, or output-affecting linear pathways (OALPs) from the decomposition of TALPs, advanced output-affecting linear pathway (A-OALP) decomposition from algorithms separate the output variables of each execution pathway such that there is only one output variable per A-OALP, converting an algorithm into a set of process groups. A-OALPs extend parallelization by combining task-like parallelism with dynamic loop parallelism. The lightweight nature of A-OALPs allows for persistent thread and code management.

18 Claims, 31 Drawing Sheets

(56) References Cited

U.S. PATENT DOCUMENTS

| | | |
|---|---|---|
| 2015/0025848 A1* | 1/2015 | Fukumoto ............ G06F 9/5061 |
| | | 702/186 |
| 2016/0085512 A1 | 3/2016 | Howard |
| 2016/0188299 A1 | 6/2016 | Howard |
| 2019/0114557 A1 | 4/2019 | Ashrafi |
| 2021/0019158 A1 | 1/2021 | Howard |
| 2021/0142143 A1 | 5/2021 | Howard |
| 2022/0400163 A1 | 12/2022 | Howard |
| 2023/0281543 A1 | 9/2023 | Howard |
| 2024/0119109 A1 | 4/2024 | Howard |
| 2024/0168758 A1 | 5/2024 | Howard et al. |
| 2025/0085940 A1 | 3/2025 | Smith et al. |
| 2025/0085941 A1 | 3/2025 | Smith et al. |

FOREIGN PATENT DOCUMENTS

| | | |
|---|---|---|
| WO | 2005111843 A2 | 11/2005 |
| WO | 2012021523 A2 | 2/2012 |
| WO | 2012024435 A2 | 2/2012 |
| WO | 2013036824 A2 | 3/2013 |
| WO | 2013184952 A1 | 12/2013 |

* cited by examiner

Example Known Decomposition of Algorithm to TALPs to OALPs

*Example TALP Selection Table*

Example TALP Selection Table using Indirect Input Path Selection Variables

*Known OALPs from TALP Decomposition*

*Example Decomposition of Algorithm to Multiple A-OALPs*

A-OALPs from Algorithm Decomposition

*Example Non-Constant Value Ranges from Comparison Types (Integers)*

Type-2 Advanced Output Affecting Linear Pathways

A-OALP Tree Graph Represents Decomposition Analogous to Mathematical Functions

*Generation of A-OALP Curve Fits Part A*

Linking Input Variables to Looping Structures

*Various Time Predictions without Constants from Looping Structures*

Example Code Instances for A-OALP-Based Task-Like Plus Dynamic Loop Unrolling Parallelization Example A-OALP Server Hardware Controller Detailed Block Diagram Serial Code, A-OALP-Based Two-Core Hierarchical Outer Loop Parallelization Un-Pooled Multi-Thread A-OALP Execution Thread Model Pooled Multi-Thread A-OALP Execution Thread Model

*Persistent Pooled Multi-Thread A-OALP Execution Thread Model*

Persistent Thread Pool with Persistent A-OALP

Example Single Server, Single Socket Multicore Cross-Communication Patterns

*Multiple Socket Allocation Using Threads*

SOFTWARE SYSTEMS AND METHODS FOR ADVANCED OUTPUT-AFFECTING LINEAR PATHWAYS

TECHNICAL FIELD

The present invention relates generally to algorithm decomposition, software parallelization, serial and parallel software analytics generation, software/hardware/and input dataset dynamic optimization, and more particularly to advanced output-affecting linear pathways (A-OALPs).

BACKGROUND OF THE INVENTION

U.S. Pat. No. 11,520,560, Computer Processing and Outcome Prediction Systems and Methods, which is fully incorporated herein by reference, addresses the decomposition of existing application source code, algorithms, processes, software modules, and software functions into executable and analyzable components called time-affecting linear pathways (TALPs). U.S. Patent Application Publication No. 2024/0119109, Methods and Systems for Time-Affecting Linear Pathway (TALP) Extensions, which is fully incorporated herein by reference, addresses the decomposition of a TALP into output-affecting linear pathways (OALPs). Various techniques discuss the concept of OALPs that contain a single input and multiple output variables, which was shown to be useful in determining the sensitivity of the outputs of the associated TALP to the values of each input variable. OALPs did not generally represent a complete transformation of the data and were seen only as an analytical expansion to the TALP model.

Most computer programming languages have the concept of process grouping. For example, there are subroutines, functions, tasks, components, objects, and/or modules associated with an application. These process grouping concepts do not guarantee that a computer language function is defined such that given some set of input values, there is only a single output value, which seems to be the original intent of the C computer language as shown by the multiple input, single output formal definition of a function. The "C" computer language family, which includes the following computer languages: Agora, Alef, Amiga E, AMPL, AWK, Axum, BCPL, C,C Shell/tchsh, C*, C++, C--, Cg, Ch, Chapel, Charm, Cilk, CINT, Claire, Cyclone, C#, D, Dart, E, eC, Fantom, Fusion, Go, Hack, Handel-C, HolyC, Java, JavaScript, Limbo, LSL, Lite-C, LPC, Neko, Nemerle, nesC, Newsqueak, Nim, Noop, NXC, NQC, OAK, Objective-C, OpenCL C, Perl, PHP, Pike, PROMAL, R, Ruby, Rust, S-Lang, SA-C, SAC, Seed7, Split-C, Squirrel, Swift, Telescript, TypeScript, Umple, Unified Parallel C, V, and Zig, all contain process groups that typically allow for multiple formal inputs and a single formal output. However, the formal input variables are defined using either pass-by-value or pass-by-reference techniques. The use of pass-by-value techniques does not inherently circumvent the formal process group definition. The use of pass-by-reference input variables means that the formal process group definition can be circumvented when pass-by-reference input variable values are changed, forcing these variables to also be outputs. In addition, writing to data streams or files circumvents the formal process group definition. There is no guarantee of a unique relationship between some input dataset and a single corresponding output data value.

SUMMARY OF THE INVENTION

If instead of decomposing an algorithm (including source code, processes, software modules, or software functions) into time-affecting linear pathways (TALPs), where each execution pathway can have multiple outputs, the algorithm is instead decomposed such that each execution pathway contains only a single output variable, the resulting execution pathways would represent process groups as originally envisioned for "C" computer language family process groups. This type of decomposition is known herein as advanced output-affecting linear pathway (A-OALP) decomposition. Each execution pathway can thus be represented by a set of process groups that are analogous to the original intent of "C" computer language family process groups.

The present invention converts an algorithm into a set of A-OALPs. Consider that the original intent of a "C" computer language family process group is a subset of general computer science-defined tasks, that is, a task with at least one input variable and only one output variable. Further consider that an algorithm can contain multiple A-OALPs. Together this means that all A-OALPs of a particular algorithm can be executed concurrently and each concurrently executing A-OALP can use an analog of dynamic loop unrolling techniques shown in U.S. Pat. No. 12,147,781, Computer Processing Outcome Prediction Systems and Methods, and U.S. Pat. No. 12,099,446, Method and System for Software Multicore Optimization, which are fully incorporated herein by reference, to further increase the parallel execution of the algorithm.

It should be noted that A-OALPs can contain looping structures and when the loop iterations of those structures are related to some set of input variable attribute values then processing time can be varied by varying those input variable attributes that affect loop iterations. This is similar to the variable time discussed for TALPs. It is possible to convert the timing values of a set of an A-OALP's input variables that have been paired to a set of values for the output variable such that a series of associated predictive monotonic curves is formed using either standard curve-fitting methods or the curve-fitting methods described in U.S. Pat. No. 10,496,514, System and Method for Parallel Processing Prediction, U.S. Pat. No. 11,789,698, Computer Processing and Outcome Prediction Systems and Methods, U.S. Pat. No. 11,861,336, Software Systems and Methods for Multiple TALP Family Enhancement and Management, U.S. Pat. No. 11,914,979, Software Systems and Methods for Multiple TALP Family Enhancement and Management, U.S. Pat. Nos. 12,099,446, 12,147,781, and 12,175,224, Software Systems and Methods for Multiple TALP Family Enhancement and Management, which each of the references listed above and below being fully incorporated herein by reference. These curve fits are used to generate advanced time complexity for A-OALPs and the scaled versions used to generate advanced speedup for A-OALPs.

The set of A-OALPs for an execution pathway represents a set of complete data transformations, which are software tasks that can be executed concurrently. This concurrency, task-like parallelization, is combined with the concurrency from the dynamic loop unrolling parallelization and means that generally A-OALPs offer greater parallelism than TALPs for the execution pathway. Since each output variable represents a separate data transformation for the process group, it is possible to separate those transformations, which is the basis of the present invention.

A-OALPs are useful in the management of any multi-sever, multiprocessor, multicore computer hardware system used to execute software algorithms. Although there can be a plethora of secondary analytics associated with A-OALPs, there are only six basic prediction analytics that are defined from the curve fits associated with A-OALPs: advanced time complexity, advanced speedup, advanced space complexity, freeup, energy complexity, and energy efficiency. These curve fits are used to predict execution time, execution time efficiency, memory allocation, memory allocation efficiency, energy use, and energy use efficiency per input dataset for each A-OALP executing on a given multi-sever, multiprocessor, multicore computer hardware system. These prediction analytics are shown to be used in a new and unique parallelization method, task-like plus dynamic loop unrolling, that automatically allocates hardware servers and the number of parallel cores per server required for a software application to meet a given processing performance, or energy use goal for any set of arbitrary but valid input data values given timing and memory allocation constraints.

Rather than generating a set of static analytics as used in other software analytics, the present invention uses a set of prediction analytics associated with A-OALPs to automatically and dynamically reconfigure the hardware per input dataset by changing the allocated count of servers, cores per server, and memory per core. It has been determined that it is possible to get near perfect prediction accuracy and precision for time, space, and energy variables.

BRIEF DESCRIPTION OF THE DRAWINGS

The accompanying drawings, which are incorporated herein and form part of the specification, illustrate various embodiments of the present disclosure and, together with the description, further explain the principles of the disclosure and enable a person skilled in the pertinent art to make and use the embodiments disclosed herein. In the drawings, like reference numbers indicate identical or functionally similar elements.

DETAILED DESCRIPTION

Figure 1:
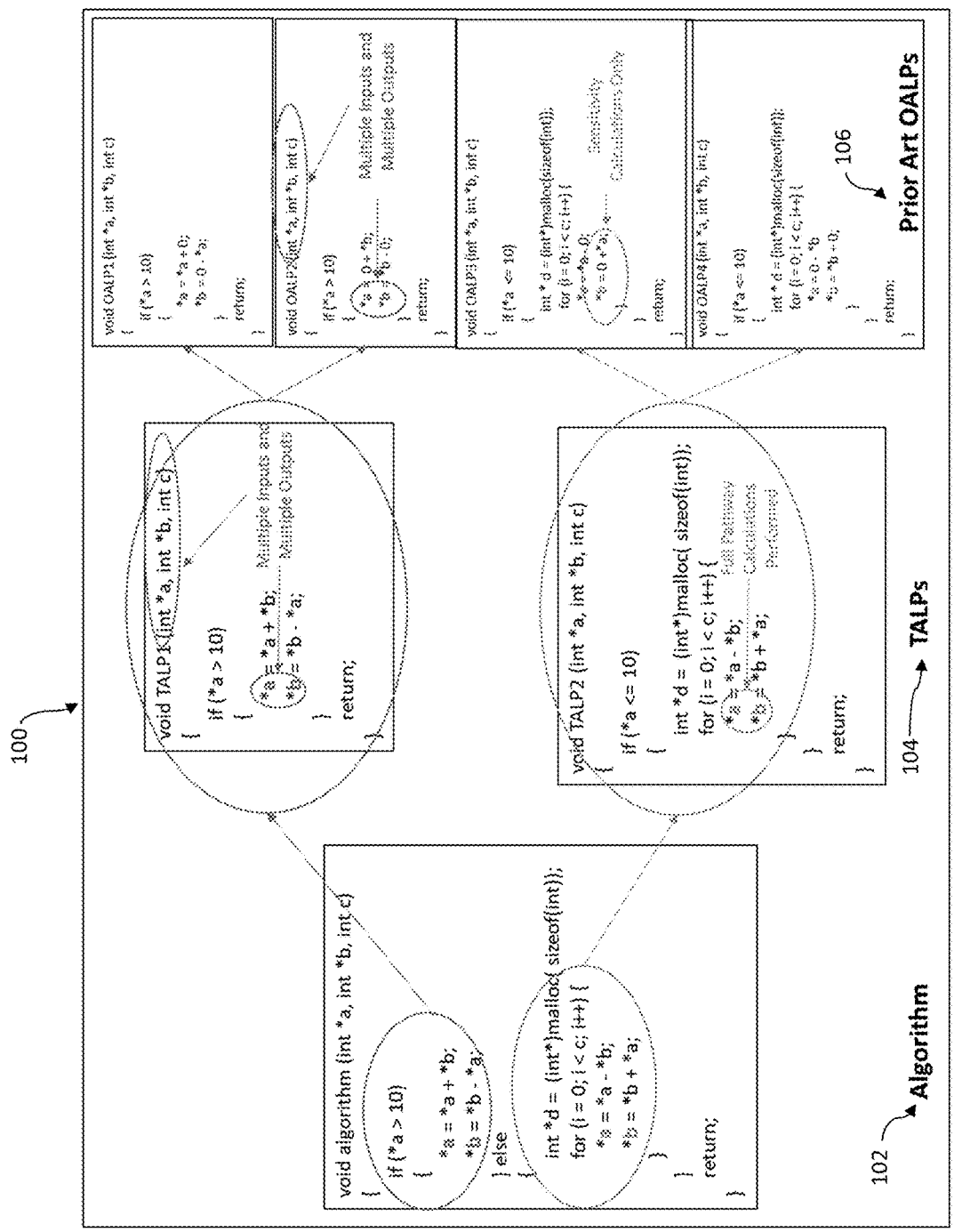
FIG. 1 shows the decomposition of a software algorithm first into a set of time-affecting linear pathway (TALP) software codes and then further decomposed into output-affecting linear pathways (OALP) software codes, in accordance with embodiments of the present invention.

The present invention details the effects of advanced output-affecting linear pathways (A-OALPs) along with their associated curve fits used in modeling and predicting the behavior of the A-OALPs on a particular hardware system, given an arbitrary but valid input dataset. The original algorithm can be optimized on the hardware for processing performance or energy use using A-OALPs that inherently provide task-like plus dynamic loop unrolling parallelization.

A-OALPs can contain looping structures and when the loop iterations of those structures are related to some set of input variable attributes then processing time can be varied by varying those input variable attribute values that affect loop iterations. This is similar to the generation of time prediction curve fits used to predict variable time as discussed for time-affecting linear pathways (TALPs).

A-OALPs can contain heap memory (a subset of RAM) allocation, and when the allocation of such memory is related to some set of input variable attributes then memory can be varied by varying those input variable attribute values that affect heap space memory allocation. This is similar to the generation of space prediction curve fits used to predict variable space as discussed for TALPs.

There are six basic prediction analytics that are defined from the curve fits associated with A-OALPs: advanced time complexity, advanced speedup, advanced space complexity, freeup, energy complexity, and energy efficiency. Most of these analytics were associated with TALPs in prior techniques and methods. Various TALP methods and systems are disclosed in U.S. Pat. No. 11,520,560, which is fully incorporated herein by reference and can be implemented with various aspects, embodiments, methods, and systems of the present invention.

A TALP is an execution pathway through an algorithm or software code that includes the looping structures of that pathway and the transformation of the input variables to all output variables. Time prediction for TALPs occurs through varying the input loop control variable attributes and generating a time prediction curve fit. Similarly, memory allocation (space) prediction occurs through varying the input memory allocation control variable attributes and generating a space prediction curve fit. This means that examining the input variable attribute values is enough to predict the processing time and memory allocation of a TALP. The scaled processing time (shown to be analogous to Amdahl's "speedup" metric) was shown to enable a dynamic form of parallelization called dynamic loop unrolling parallelism. There can be several issues with the TALP model:
  1) Task-like parallelism was not supported.
  2) Software code used to process one output variable that was unrelated to another output variable could not be mitigated or eliminated.
  3) The computational "weight" of a TALP was the same as the computational "weight" of the original software code, making TALPs generally unsuitable for use in persistent thread, persistent algorithm solutions.
  4) There is nothing inherent to TALP use of multiple sockets or multiple servers.
  5) There is nothing inherent to TALP multiple server cross-communication overhead mitigation. These points are addressed with the use of a new model, A-OALPs.

Various devices or computing systems can be included and adapted to process and carry out the aspects, computations, and algorithmic processing represented by the software systems and devices of the present invention may include a processor, which may include one or more microprocessors and/or one or more circuits, such as an application specific integrated circuit (ASIC), field-programmable gate arrays (FPGAs), CPUs, GPUs, GPGPUs, TPUs, FPUs, single-core, multicore, etc. Further, the devices can include a network interface. The network interface is configured to enable communication with a communication network, other devices and systems, and servers, using a wired and/or wireless and/or quantum connection.

The devices or computing systems may include memory, such as non-transitive, which may include one or more non-volatile storage devices and/or one or more volatile storage devices (e.g., random access memory (RAM) or Qubits. In instances where the computing devices include a microprocessor, computer readable program code may be stored in a computer readable medium or memory, such as, but not limited to drive media (e.g., a hard disk or SSD), optical media (e.g., an OVO), memory devices (e.g., random access memory, flash memory, Qubits), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input devices are configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile devices screens, tablet screens, speakers, remote screens, etc. The output devices can be configured to display images, media files, text, video or play audio to a user through speaker output.

Server processing systems for use or connected with the systems of the present invention, can include one or more microprocessors, and/or one or more circuits, such as an application specific integrated circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable program code may be stored in a computer readable medium, such as, but not limited to drive media (e.g., a hard disk or SSD), optical media (e.g., a DVD), memory devices, etc.

FIG. 1 is a software code diagram 100 depicting an example software algorithm 102 and follows the potential execution pathways of that algorithm and then separates and transforms each potential execution pathway into its own executable process. Each executable process is called a time affecting linear pathway, TALP 104. Here, each execution pathway contains assignment statements and looping structures (for, do, while etc.), but the previously known techniques 106 show that each execution pathway can also contain subroutine calls and other conditional statements (if, switch, ternary conditional operator, try-catch, etc.). Each branch of each conditional statement is used to form a separate execution pathway, which lead to a separate TALP. In this example there are two pathways identified that are considered TALPs. The first TALP (TALP1) has no looping structures and therefore its processing time is static. Notice that there are multiple inputs and outputs associated with this TALP. The second TALP (TALP2) has a looping structure whose loop iterations vary with the input variable values of the variable named "c." This TALP also has multiple inputs and outputs. Since the looping structure in the second TALP varies with input variable values, this TALP is considered to have variable processing time. Notice that neither TALP has memory allocation that is associated with input variable values, meaning that both TALPs have static space complexity. The TALPs are shown to further decompose into known OALPs, which differ from their associated TALP in that each is associated with a single input variable and used to find the sensitivity of the output variables to each input variable.

Figure 1A:
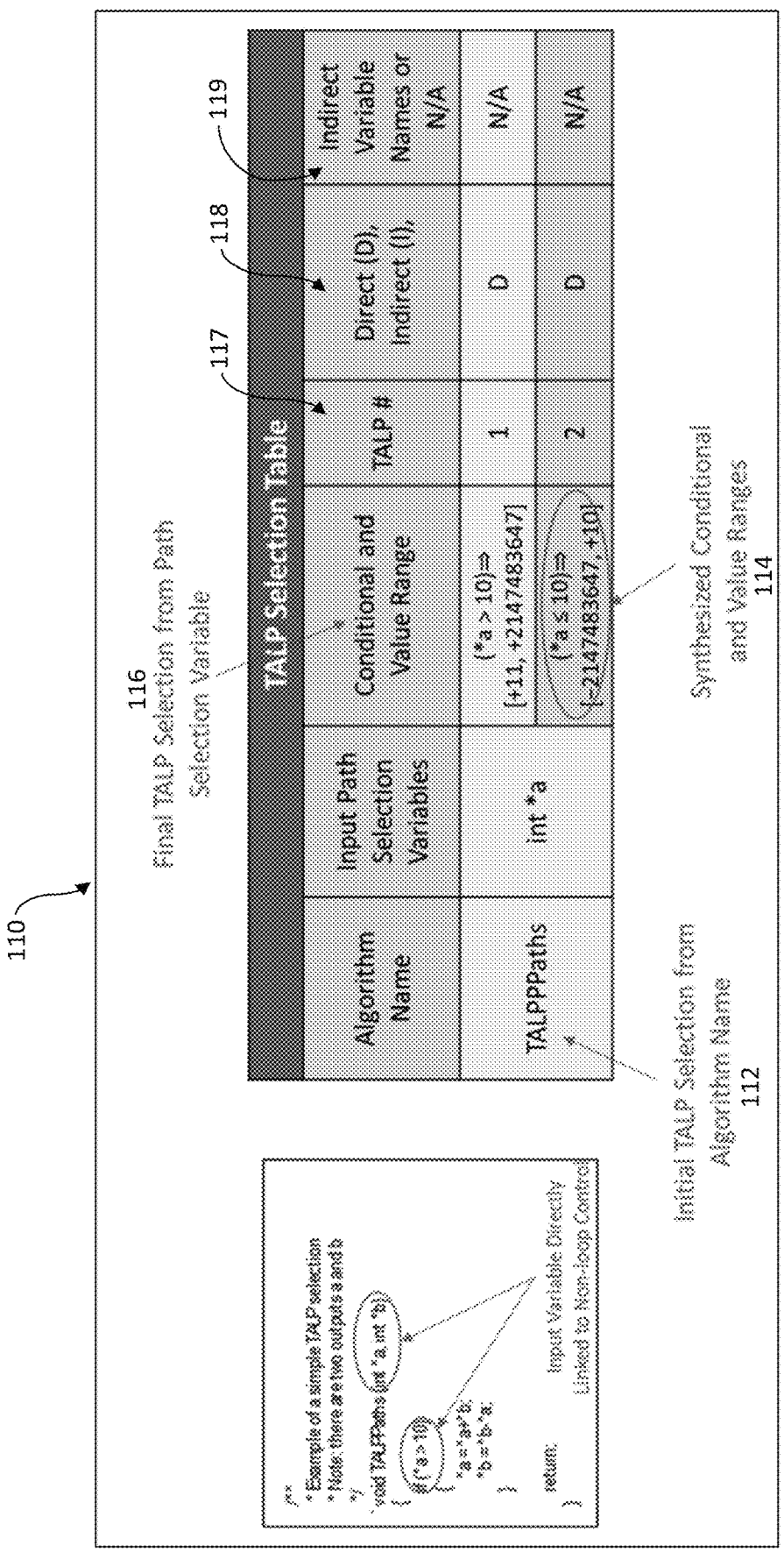
FIG. 1A shows an example of a TALP selection table with direct input variables, in accordance with embodiments of the present invention.

FIG. 1A is an example of a TALP selection table 110. The first column contains the algorithm name 112 (alternatively called application name, function name, module name, task name etc.). The algorithm name is the first level used for TALP identification and can be determined algorithmically or via user input. The next column contains the system-determined input path selection variables. This determination is made automatically by tracing the input variables to various non-loop control conditions (if, switch, ternary, etc.). Once a link between an input variable and a non-loop control condition has been established, that condition is then analyzed to determine the true condition value range for the input variables. There may or may not be a false condition. If not, then a logical "OR" of the non-loop control condition is created that synthesizes the false condition and its value range 114. These values are stored in the Conditional and Value Range column 116 of the table. Each true and false condition, whether inherent or synthesized denotes a different TALP, which is enumerated as an integer value in the TALP #column 117 of the table. This example represents the direct use of an input variable in the selection of the TALP, indicated by the "D" symbol in the "Direct (D), Indirect (I)" column 118 of the table. A "D" symbol causes the system to ignore any "Indirect Variable Names or N/A" column 119 value.

Figure 1B:
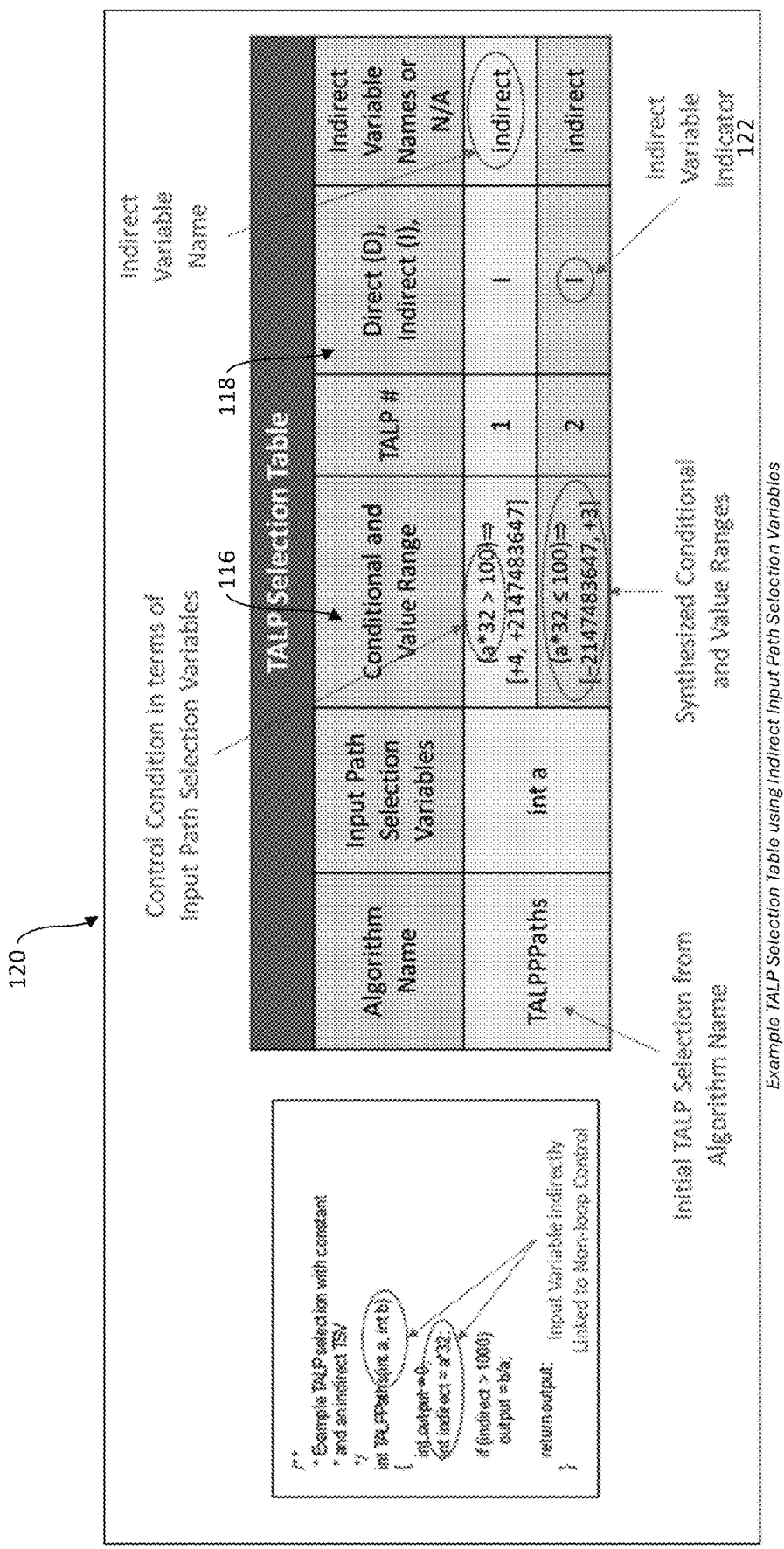
FIG. 1B shows an example of a TALP selection table with indirect input variables, in accordance with embodiments of the present invention.

FIG. 1B is another example of a TALP selection table 120. This one uses an indirect input variable to perform the selection. An indirect variable herein means a dependent variable with an associated independent input variable used in a non-loop control condition. The indirect variable is converted into direct variable form. That is, the independent input variable is made visible. This is shown in the conditional and value range column 116 where the indirect variable named "indirect" is converted into "α*32". The use of an indirect variable is indicated using an "I" symbol in the "Direct (D), or Indirect (I)" 122 column 118 of the table. When the "I" exists, the variable name in the "Indirect Variable Names or N/A" column id filled with dependent variable name used in at least one non-loop control condition. It is possible to have an indirect variable contain another indirect variable so long as eventually there is an input variable in the chain of indirect variables.

Figure 2:
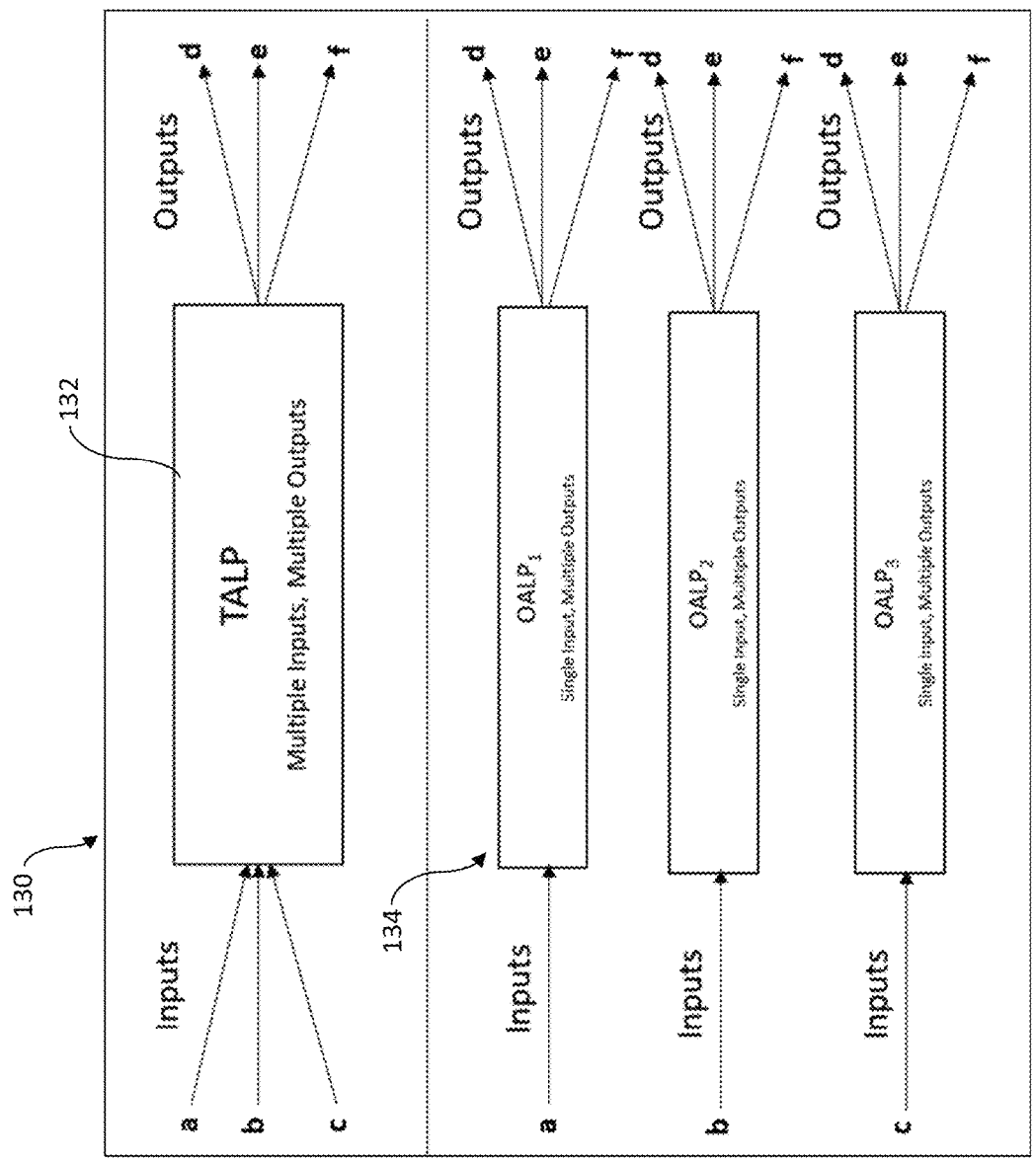
FIG. 2 is a diagram showing a generalized description of the OALPs as a decomposition of a TALP, in accordance with embodiments of the present invention.

FIG. 2 is a diagram 130 showing the general relationship between a TALP 132 and its associated OALPs 134. This can be thought of as a diagrammatic view of FIG. 1. As can be seen, the TALP input variables that affect the pathway's inner activity (loops and assignments), but not the pathway selection itself, are separated. Each separate input variable is then used to define an OALP with multiple output variables.

Figure 3:
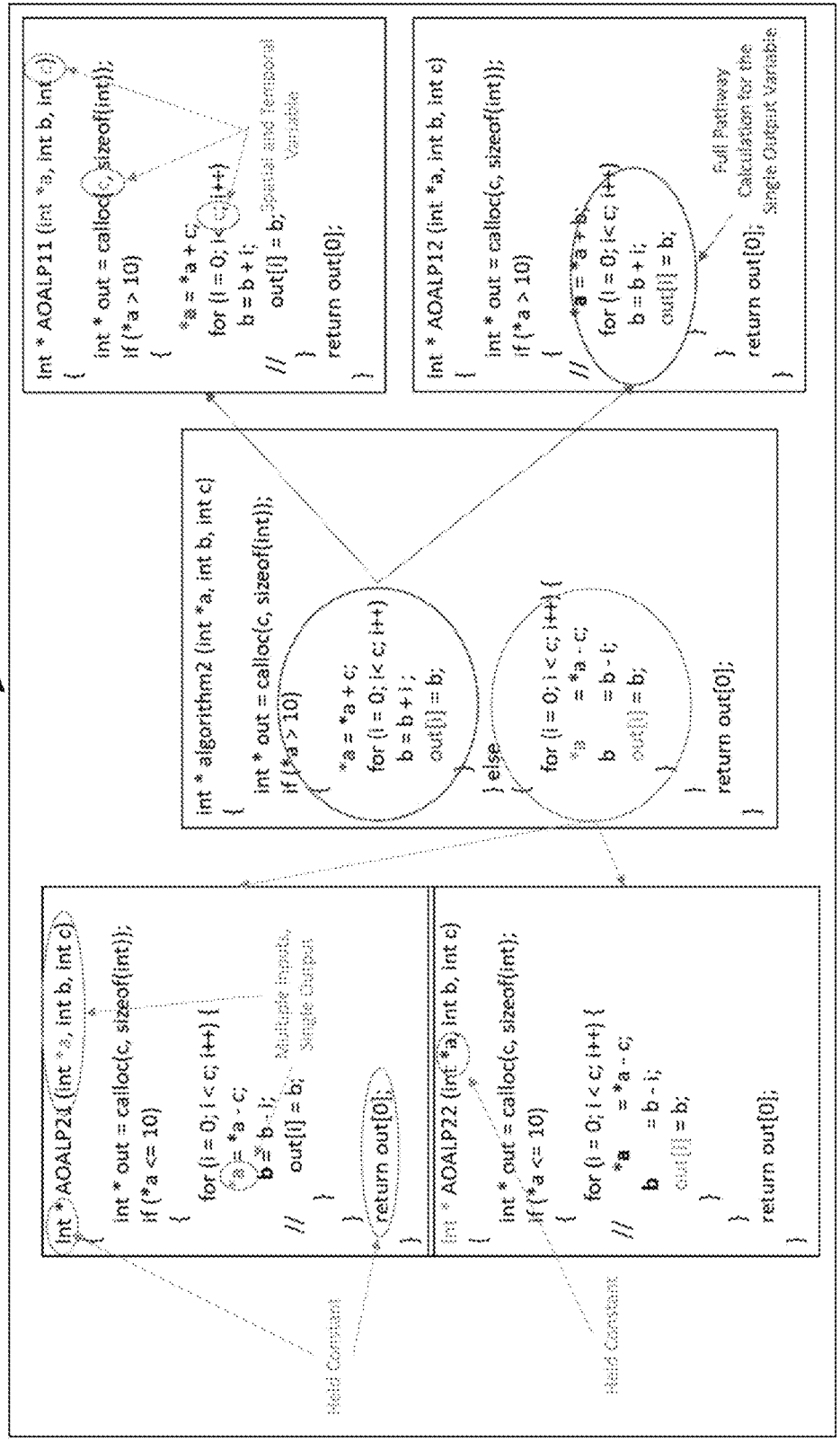
FIG. 3 shows an example of the decomposition of a software algorithm into a set of advanced output-affecting linear pathways (A-OALPs) as a direct decomposition of an algorithm, in accordance with embodiments of the present invention.

FIG. 3 is a software code diagram 140 depicting the decomposition of an algorithm into a set of A-OALPs. As can be seen, all inputs are retained from the original algorithm. The number of A-OALPs is a function of both the number of original execution pathways and the number of independent output variables associated with each pathway. Here, the number of A-OALPs shown is twice the number of TALPs for the same code. Since, like a TALP, the set of A-OALPs represent the entire process needed to calculate each output variable from the input variables, the entire data transformation is represented. However, each A-OALP is fully separable from all other A-OALPs, increasing the amount of algorithm-native parallelism. That is, each pathway can now be separated into multiple tasks (A-OALPs) in a manner analogous to task parallelism. Since the A-OALPs retain their looping structures and all input variable values, dynamic loop unrolling can also be performed, resulting in multiple instances of each A-OALP. Thus, A-OALPs can multiply the available algorithm parallelism shown by the known techniques by the number of independent output variables. This result is unanticipated as it means that there can simultaneously be both task parallelism and dynamic loop unrolling parallelism active for the same section of code.

Figure 4:
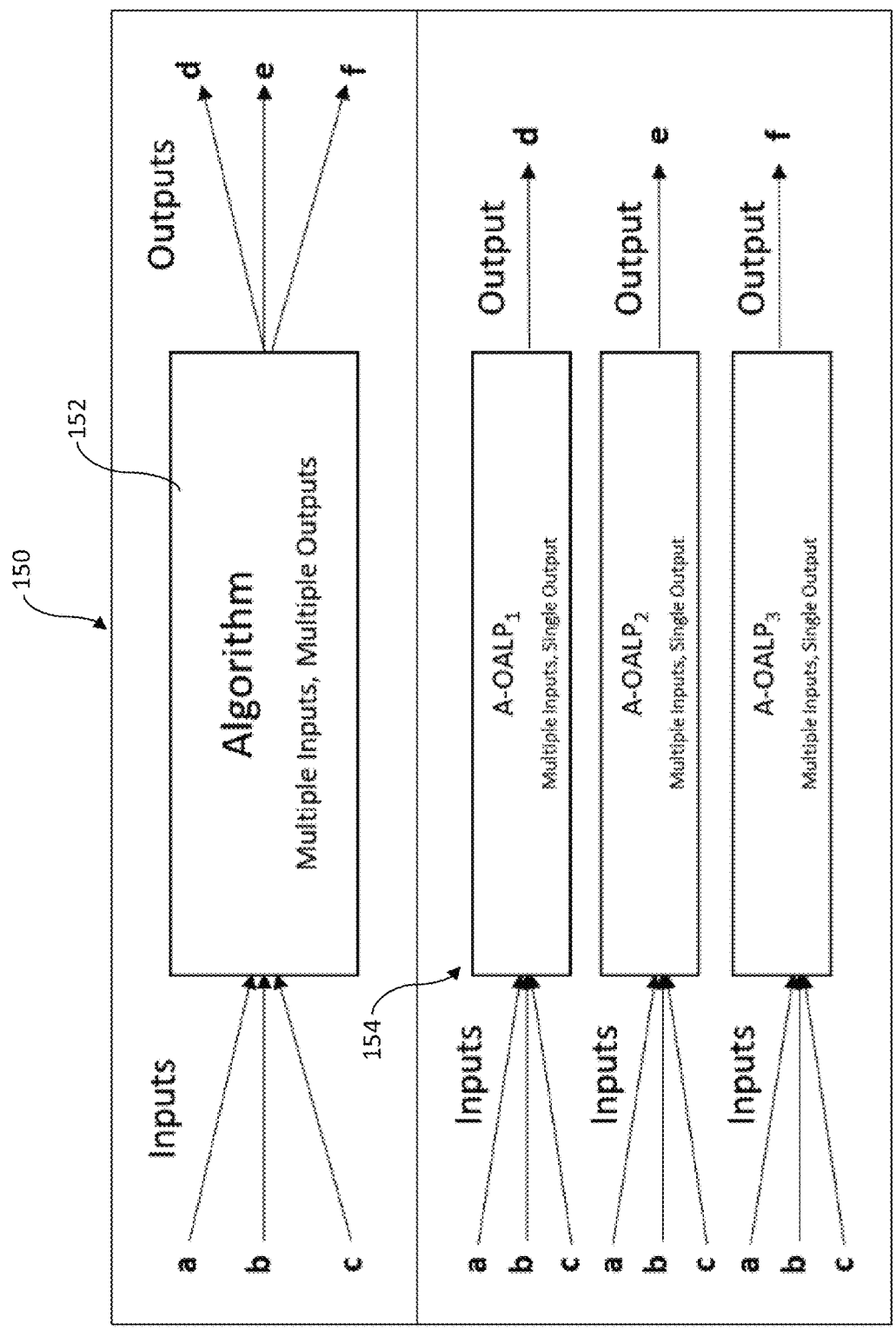
FIG. 4 is a diagram showing the generalized decomposition of a software algorithm into multiple A-OALPs, in accordance with embodiments of the present invention.

FIG. 4 shows the general diagrammatic view 150 of the decomposition of an algorithm 152 into a set of A-OALPs 154. This view highlights the structural differences between algorithms and A-OALPs. Notice that all input variables associated with the originating algorithm are replicated for each A-OALP and that the set of the output variables of all associated A-OALPs replicates the output variables of the originating algorithm. It should be noted that an output variable does not use any of the other output variables on the execution pathway. For example, in this figure that means that the output variable "d" does not use output variables "e" or "f", output variable "e" does not use output variables "d" or "f", and output variable "f" does not use output variables "d" or "e".

Figure 5:
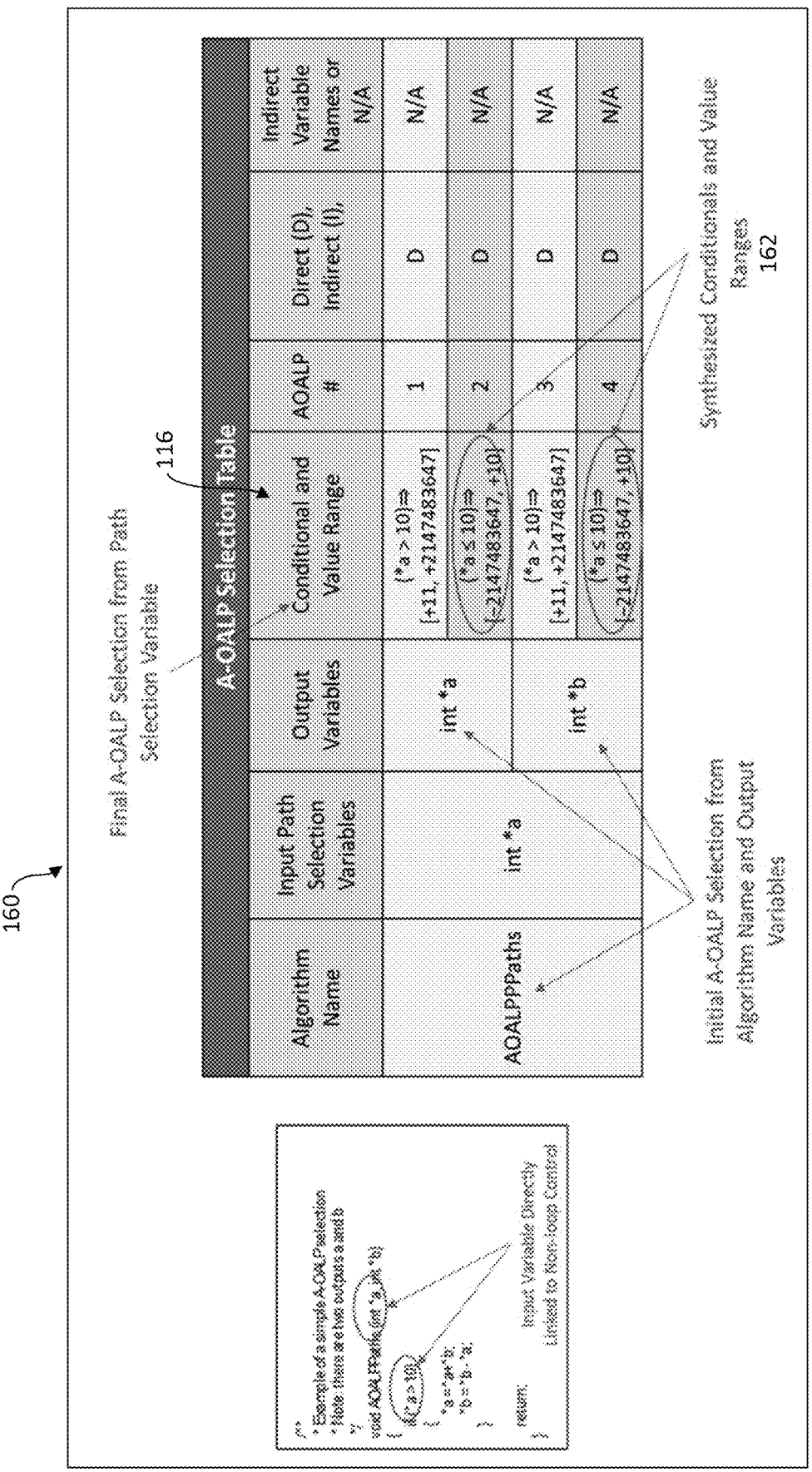
FIG. 5 is an example of an A-OALP selection table, in accordance with embodiments of the present invention.

FIG. 5 shows the A-OALP selection table 160. This table shows the system can automatically select an A-OALP, given an algorithm name, an arbitrary but valid input data-set, and the required output variable name. Selecting an A-OALP requires that the input variable values first be applied to the path selection conditions (the conditions shown in the conditional and range column 116 of the table) of each execution pathway of the named algorithm. Given an algorithm name, the required output variable, and the correct conditional variables (either direct or indirect) and their associated value ranges, the correct A-OALP is selected. It should be noted that if more than one path selection is true then an "Undifferentiable Pathways: Algorithm Name {name plus the A-OALP number}" error is issued. If there are no conditions that match the input variable values, then an "Unsupported Input Dataset" error is issued. It should also be noted that if there is only a true condition associated with non-loop control (if, switch, ternary, etc.) then the false condition will be automatically generated by synthesizing the false condition 162, as shown in FIG. 5. There is an A-OALP selected for each output variable of the current algorithm for the current input dataset.

All A-OALPs for the current dataset for the current algorithm are executed simultaneously using a task-like parallelization model. Each A-OALP can also have multiple instances, from prior dynamic loop parallelization, that are defined using the temporal variables associated with those A-OALPs. A temporal variable is an input variable attribute that affects the number of loop iterations in at least one looping structure of the A-OALP. The total number of parallel instances is the sum of all A-OALP instances executing in parallel.

The maximum number of useable cores for an A-OALP, given an input dataset, can be decreased because of a lack of memory. Since each thread might require its own memory allocation, it is possible to run out of memory. The amount of memory required by a A-OALP is defined by its spatial variables. A spatial variable is an input variable attribute that the memory allocation (example, malloc, calloc, etc.) of an A-OALP. The memory required is the sum of the memory needed by all A-OALPs of the currently executing algorithm. If the memory required by the algorithm exceeds the memory available, then the number of A-OALP instances is decreased until they can fit in memory. If the number of A-OALP instances is one and the algorithm still exceeds available memory, then a "Memory Exceeded" error is issued.

Figure 5A:
FIG. 5A is an example table that shows various value ranges determined when there is no constant value in the non-loop control statement, allowing for the automatic generation of value ranges, in accordance with embodiments of the present invention.

FIG. 5A is a table 170 containing examples of various integer comparisons. This table is comparable to the one shown in FIG. 1A but for A-OALPs instead of TALPs. This table shows that it is possible to synthesize value ranges even in the absence of constant values in the non-loop control condition. In order to synthesize these value ranges, the righthand value of the comparison is subtracted from the lefthand side of the same comparison (unless there are non-numeric values being compared). The results of the subtraction are used to synthesize the false value ranges, which is the logical "OR" of the true value range. For example, if a equals b then the true condition yields a zero value and the false condition is not zero. This table shows examples for equal, greater than, greater than or equal to, less than, and less than or equal to comparisons. Like TALPs, A-OALPs can be generated using indirect as well as direct input values in a manner similar to that discussed in FIG. 1B.

Figure 6:
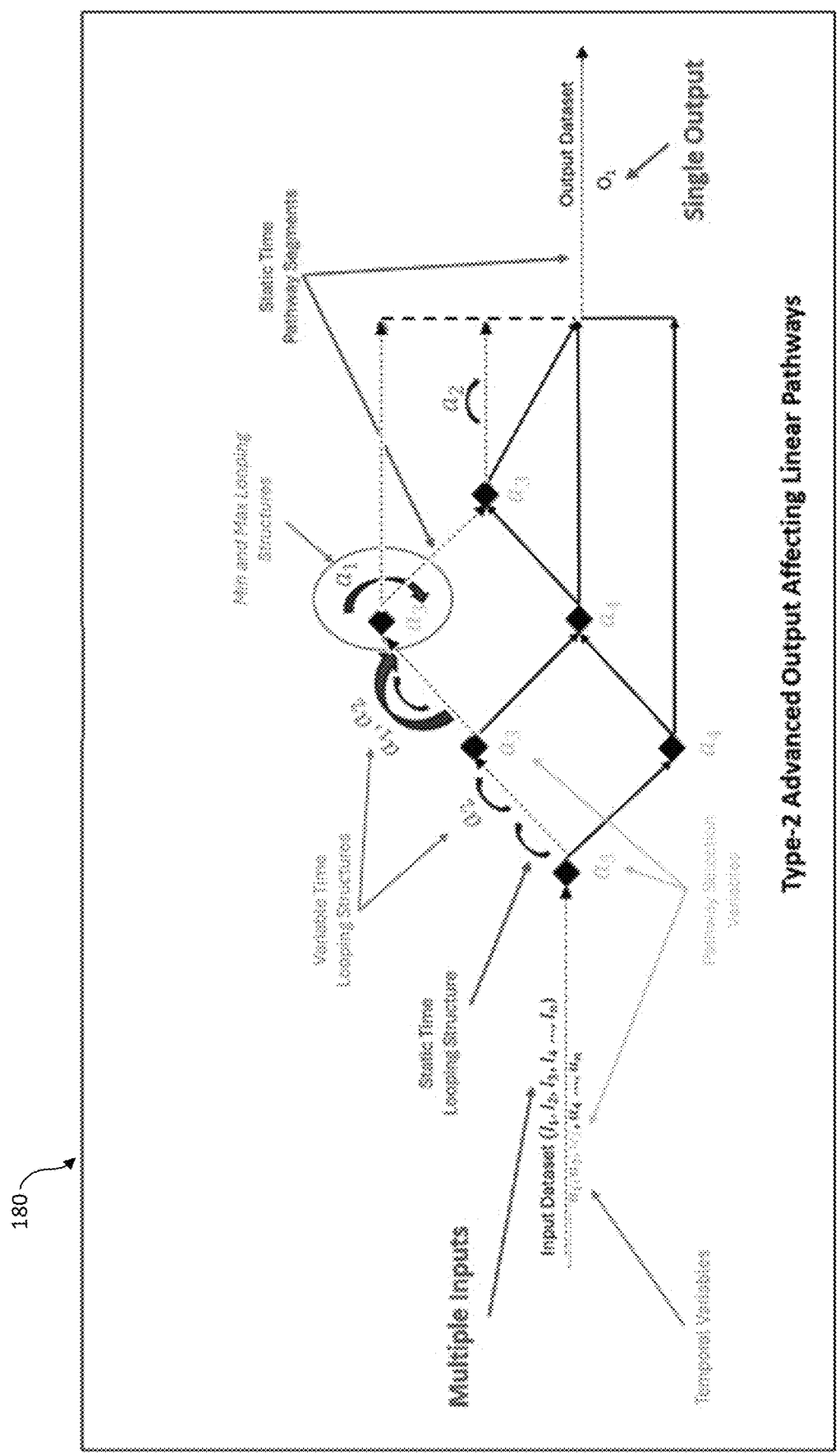
FIG. 6 is a tree diagram showing an algorithm with a particular execution pathway, highlighting a particular A-OALP within the tree; this diagram also shows the placement of both static and variable time-looping structures, in accordance with embodiments of the present invention.

FIG. 6 is a tree graph 180 of an example algorithm. This graph shows control conditions (branch points) as diamonds, pathways (containing loops, assignment statements, and subroutines) as vectors, static time loops as arcs on the pathway vectors (without any associated input variable names), variable time loops as arcs on the pathway vectors (with associated input variable names), hierarchical variable time loops as arcs within arcs with associated input variable names, probabilistic variable time loops as arcs with associated input variable names that span more than one vector, input variables used to calculate the output variable but not control loops or control conditions as input dataset variables, temporal variables as variable names used in the control of loop iterations, control condition loops as variables used to define execution pathways, and the output variable of the pathway. The set of dashed vectors on the figure represents a selected A-OALP.

The control conditions represent the conditions that define execution pathways. The values of the variables in the control conditions are used to select particular vectors. This remains true even for derived variables used in the control conditions. Vectors represent code blocks containing assignment statements (=, +=, −=, /=, *=, ++, −−, etc.), looping structures (for loop, while loop, do-while loops, etc.), subprograms (subroutines, modules, "functions" processes, objects, etc.) and the like. The sum of all branches from the entry point until the complete calculation of the output variable is the execution pathway, an A-OALP.

Dr. Gene Amdahl defined two types of software processing time: serial time and parallel time. With serial time being the processing time that occurs when code blocks execute sequentially and parallel time being when multiple code blocks can execute concurrently for the same algorithm. It has been shown that this temporal view makes manipulating time a human-centric event, as there is no strict definition of when time is serial and when it is parallel. That is, determining serialism and parallelism is a human interpretation. The present invention instead uses inherently static versus inherently variable time. Inherently static time is time that has no relationship to input variable attribute values whereas inherently variable time means that there is a relationship between input variable attribute values and processing time. This definition removes the human element and focuses on the algorithm itself. So even though standard loop unrolling (copying the inner-most vector of a loop that has a fixed number of iterations to decrease the number of iterations required) changes time, because there is no relationship to the input variable attribute values, it is still static time. Thus, static time might still be parallelizable, which is not possible with Dr. Amdahl's concept of serial time. One of the simplest ways for input variable attributes to affect time is by changing the number of loop iterations in a looping structure.

Figure 7:
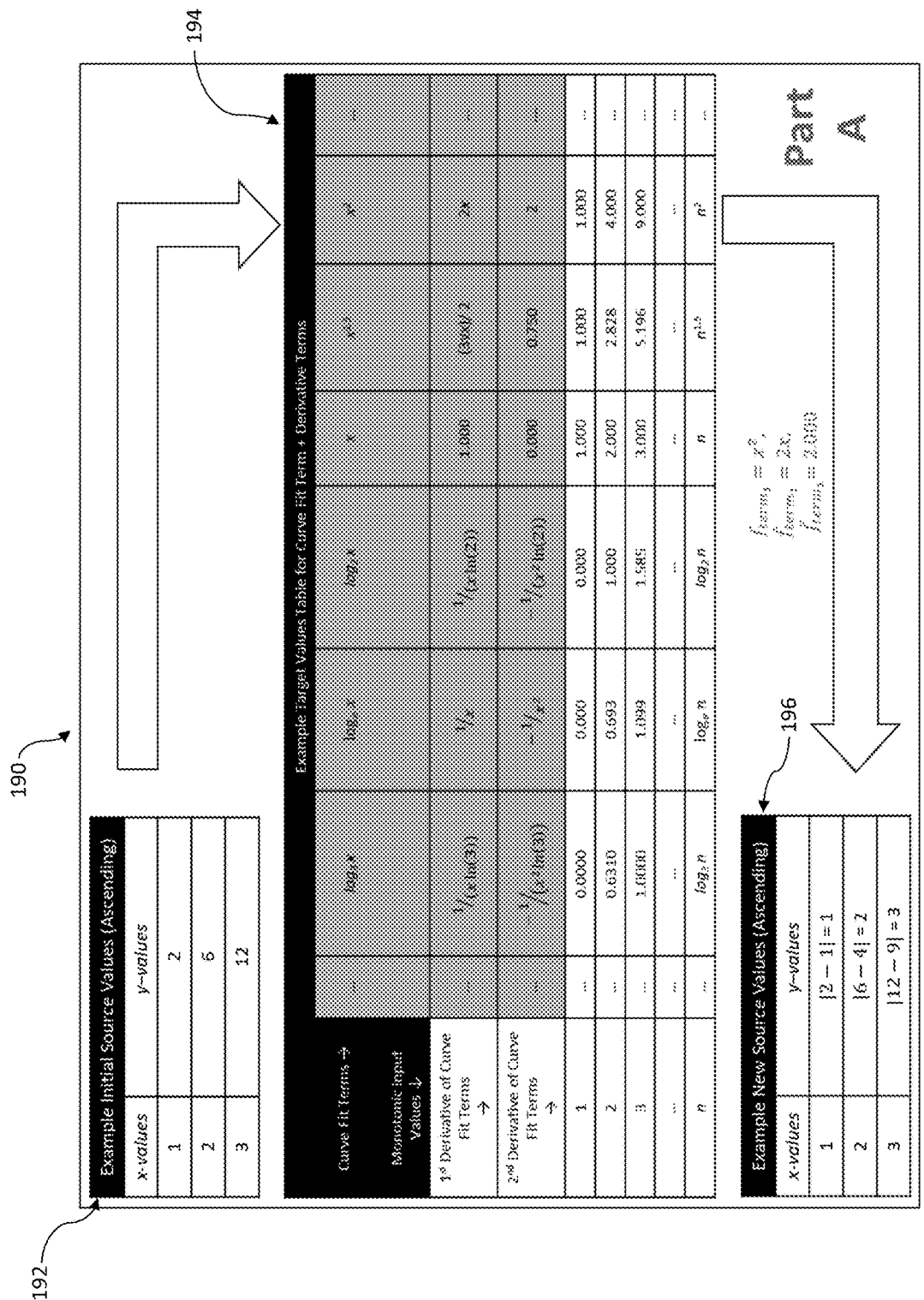
FIG. 7 is an example of using the source values table values from profiling an A-OALP to generate the first terms of a curve fit, and the generation of a new source values table, in accordance with embodiments of the present invention.

FIG. 7 is an example diagram 190 of the first part of known curve fit methods herein used in the creation of an A-OALP's processing time prediction. The initial input variable attributes that affect some algorithm's processing time are indicated as "x" values in the initial source values table 192 show here. The detected processing times when "x" values are used in the execution of the A-OALP are indicated as "y" values in the initial source values table 192. This is compared against the columns of the shown target values table 194 in the manner discussed in known techniques. Once a column match is found, for example, "$x^2$" in this case, that column header plus the column headers for the first and second derivative of the found column header are saved. The row values that match the found "x" value are shown to be subtracted from the initial source value table "y" values, generating a new source values table 196.

Figure 8:
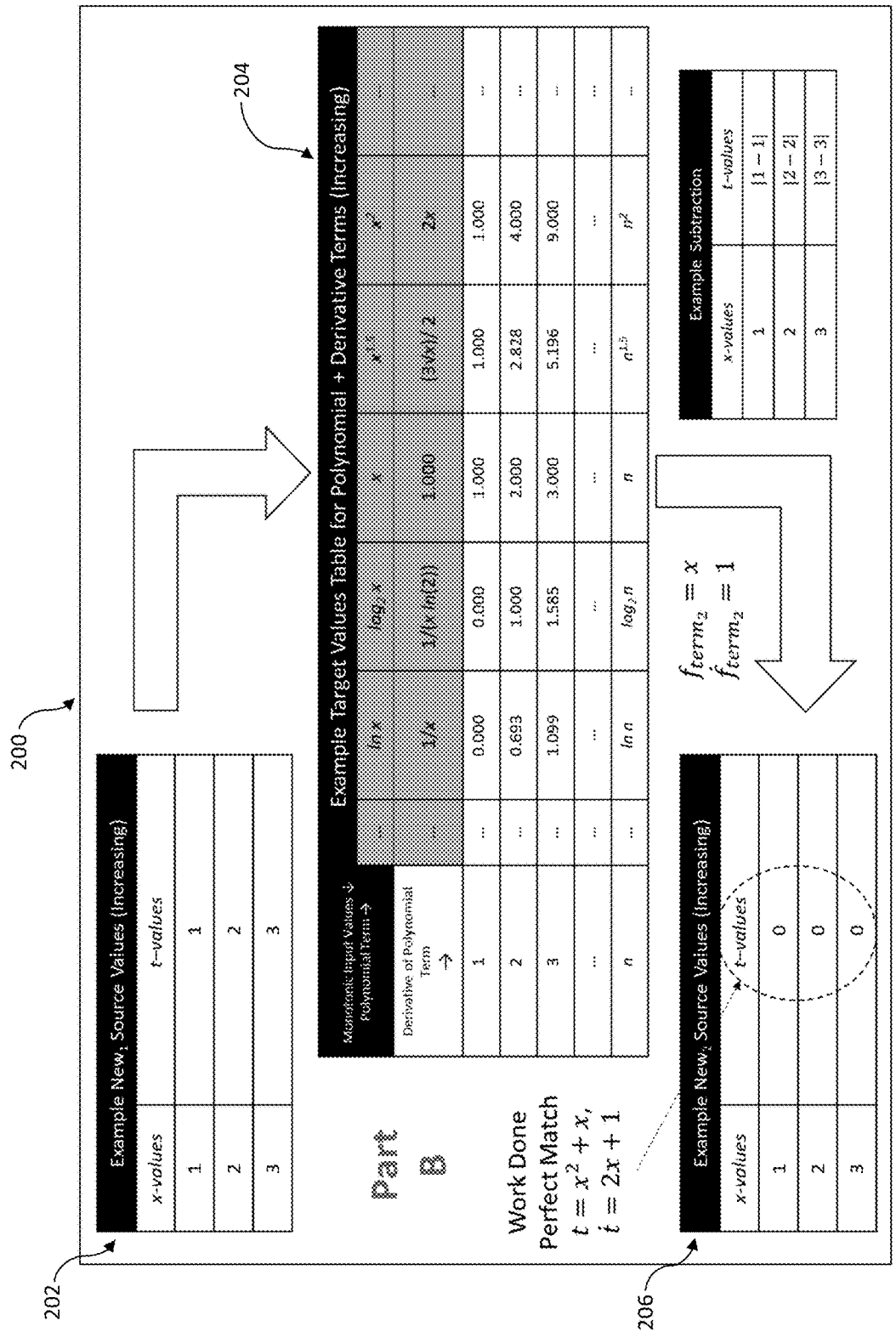
FIG. 8 is an example of using the new source values table from FIG. 7 to complete a set of curve fits, in accordance with embodiments of the present invention.

FIG. 8 is an example diagram 200 of the second part of the curve fit methods used herein in the creation of an A-OALP's processing time prediction. The generated new source values table's input variable attributes that affect some algorithm's processing time are indicated as "x" values in the new source values table 202 show here. The detected processing times used in the execution of the A-OALP are indicated as "y" values in the initial source values table 204. This is compared against the columns of the shown target values table in the manner discussed in known techniques. Once a column match is found, for example, "x" in this case, that column header plus the column headers for the first and second derivative of the found column header are saved. The row values that match the found "x" value are shown to be subtracted from the initial source value table "y" values, generating a new, new source values table 206. Notice that the values of the new, new source values table are all zero, which is one indication (others are shown in known techniques and methods) that all terms of the curve fit have been found. Also shown is the first derivative of the curve fit as generated, and there is no second derivative.

Figure 8A:
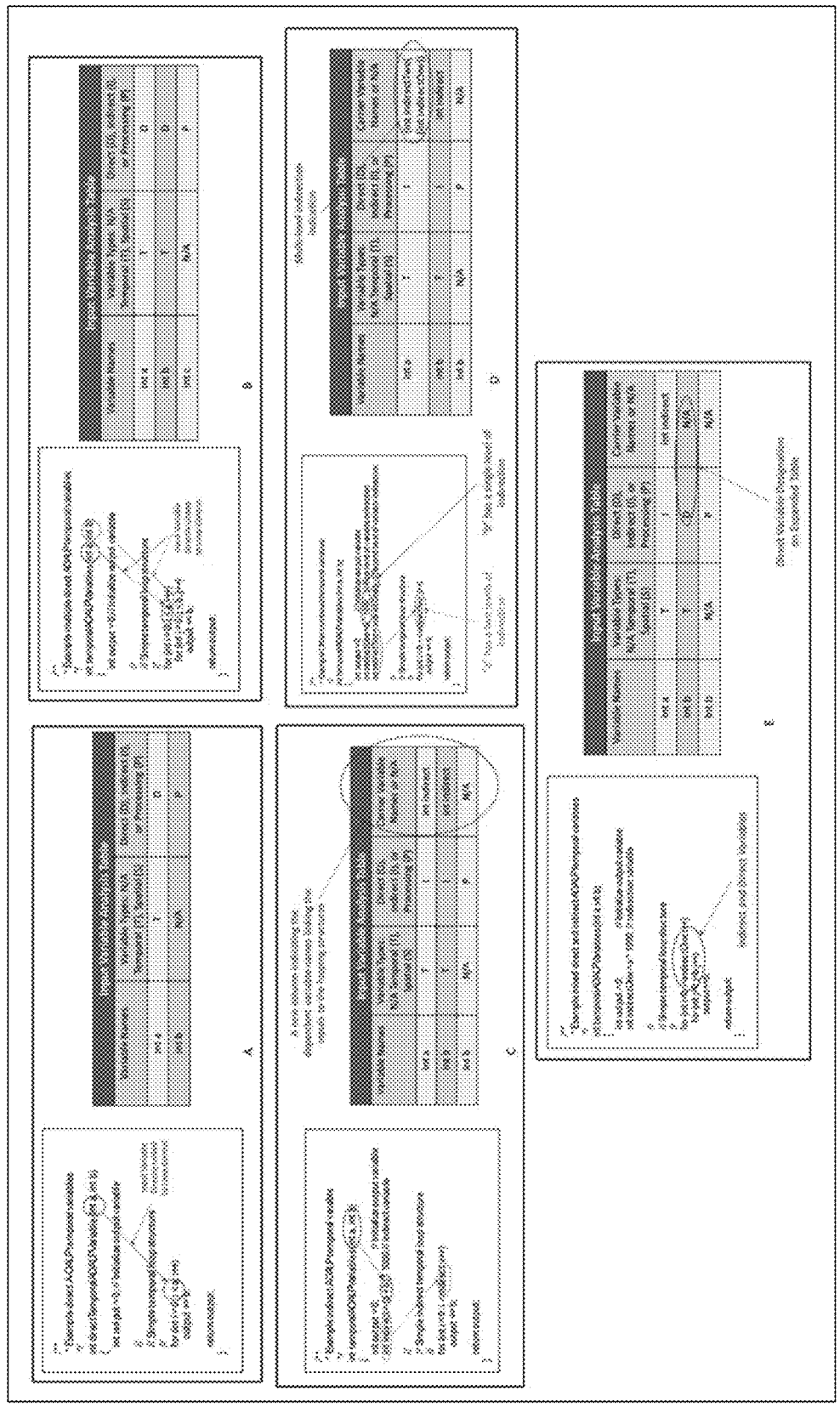
FIG. 8A is a set of examples showing various methods used to link input variable values to looping structures, which are used in the curve fits, in accordance with embodiments of the present invention.

FIG. 8A shows various examples 210 of direct and indirect input variables that affect the loop control conditions of an A-OALP. Affecting the loop control conditions has the effect of changing the number of loop iterations since the number of loop iterations performed directly changes the processing time of an A-OALP. This relationship allows for an advanced time complexity curve fit to be generated for each A-OALP.

Figure 8B:
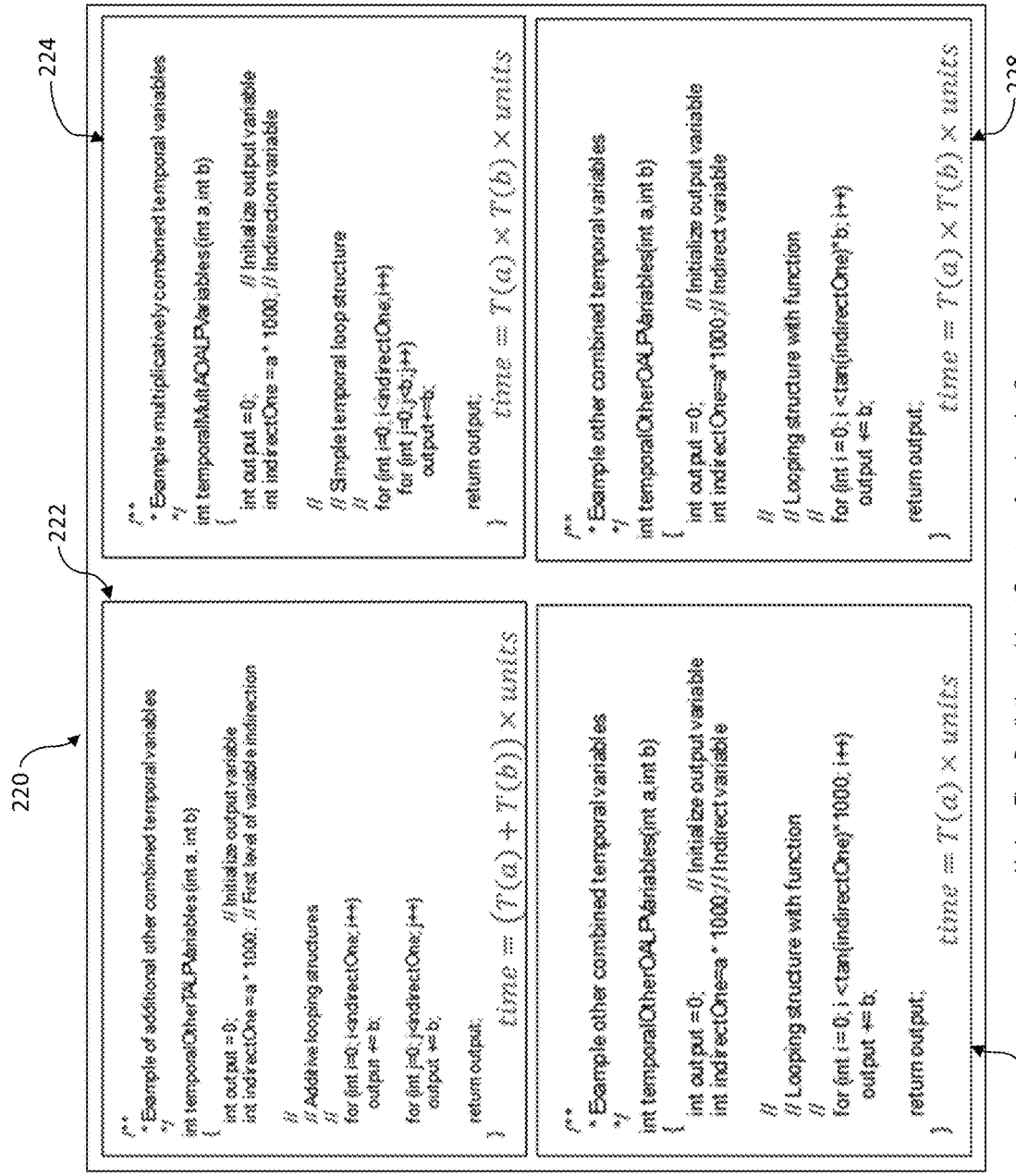
FIG. 8B is a set of examples showing how various multiple loops are converted into various time predictions, in accordance with embodiments of the present invention.

FIG. 8B shows examples 220 of multiple looping structures showing the use of those structures in advanced, multiple variable time complexity curve fits. Advanced time complexity predicts processing time. The general form of advanced time complexity will first be shown.

Equation 1: General A-OALP-Based Advanced Time Prediction Curve Fit Given:

$$a_n = \frac{a_1}{n} \rightarrow n = \frac{a_1}{a_n}$$

Where: n=# of cores,
$\alpha_1$=Input variable attribute value that affects loop iterations, on a single core The value of $\alpha_1$ divided by the smallest possible value of $\alpha$, $\alpha_{min}$, which occurs where the number of A-OALP loop iterations is one, gives the maximum possible number of cores, maxCores$_{time}$. This means that the absolute minimum value of $\alpha_1$ is on each core, that is:

$$a_n = a_{min} = \frac{a_1}{maxCores_{time}} = \frac{a_1}{a_{min}},$$

if f n=the absolute maximum # of cores

This gives the absolute fastest processing time for 1 and the non-general advanced time complexity, using the scaled advanced time complexity $$T\left(\frac{a_1}{a_{min}}\right),$$

as:

$$t \times \text{units} = T\left(\frac{a_1}{a_{min}}\right) \times t_{min} \times \text{units} = T(maxCores_{time}) \times t_{min} \times \text{units}$$

Typically, the maximum number of cores that it is possible to spread "$\alpha$" across is not the number of cores that are available. There can be an externally defined maximum number of processing elements called $p_{max}$. This maximum can be a hard limit called $p_{max_{hard}}$ or a soft limit called $p_{max_{soft}}$. $p_{max_{hard}}$ represents the current number of physically available processing elements (cores). $p_{max_{soft}}$ represents a limit set by a system operator or user on the maximum number of processing elements (cores) that can be used by an A-OALP. $p_{max}$ is the smaller of $p_{max_{hard}}$ and $p_{max_{soft}}$ when they exist. If the maximum number of cores available for processing is $p_{max}$ then time is scaled by scaling the input to the advanced time complexity curve fit as follows:

$$v_a \Big|_{=1 \leftrightarrow maxCores_{time} \leq p_{max}}^{=\frac{maxCores_{time}}{p_{max}} \leftrightarrow maxCores_{time} > p_{max}}$$

Thus, Generalized Advanced Time Complexity is Obtained:

t×units=T(v$_\alpha$×maxCores$_{time}$)×t$_{min}$×units

Where: t$_{min}$=Minimum processing time detected while curve fitting time values,
t=Predicted processing time from curve fit,
v$_\alpha$=Scale factor to generalize the time complexity curve fit for temporal variable "a",
maxCores$_{time}$=Maximum number of cores supported by input temporal variable value,
T(v$_\alpha$×maxCores$_{time}$)=Advanced scaled time complexity curve fit, general advanced speedup,
p$_{max}$=Maximum number of cores (or processing elements) currently available,
units=Temporal units (e.g., hours, minutes, etc.).

It should be Noted that:
if p$_{max}$<maxCores$_{time}$ then maxCores$_{time}$=p$_{max}$ The first example 222 has two looping structures in the same A-OALP that are serially related. This means that variable time of the first looping structure occurs first followed by the variable time of the seconding structure, making variable time additive.

Equation 2: Serially Related Time Prediction from Two Loops in the Same A-OALP $$\text{time} \times \text{units} = (T(v_a \times \text{maxCores}_{time}) + T(v_b \times \text{maxCores}_{time})) \times t_{min} \times \text{units}$$

The second example 224 has two hierarchical loops in a single looping structure. This means that for each iteration of the outermost loop, all of the inner most loop iterations are performed. Thus, there is a multiplicative relationship between the hierarchical loops.

Equation 3: Hierarchically Related Loops in the Same A-OALP $$\text{time} \times \text{units} = (T(v_a \times \text{maxCores}_{time}) \times T(v_b \times \text{maxCores}_{time})) \times t_{min} \times \text{units}$$

The third example 226 has a single loop with an indirect variable in a process group. Since the advanced time complexity will obtain the full curve fit using the detected processing time, any detected mathematical software functions can be ignored, giving equation 1.

The final example 228 shows a single loop with both a direct and an indirect input variable used. Notice that the indirect variable is multiplied by the direct variable; thus, the two variables are multiplicatively combined as occurred for equation 3.

Figure 9:
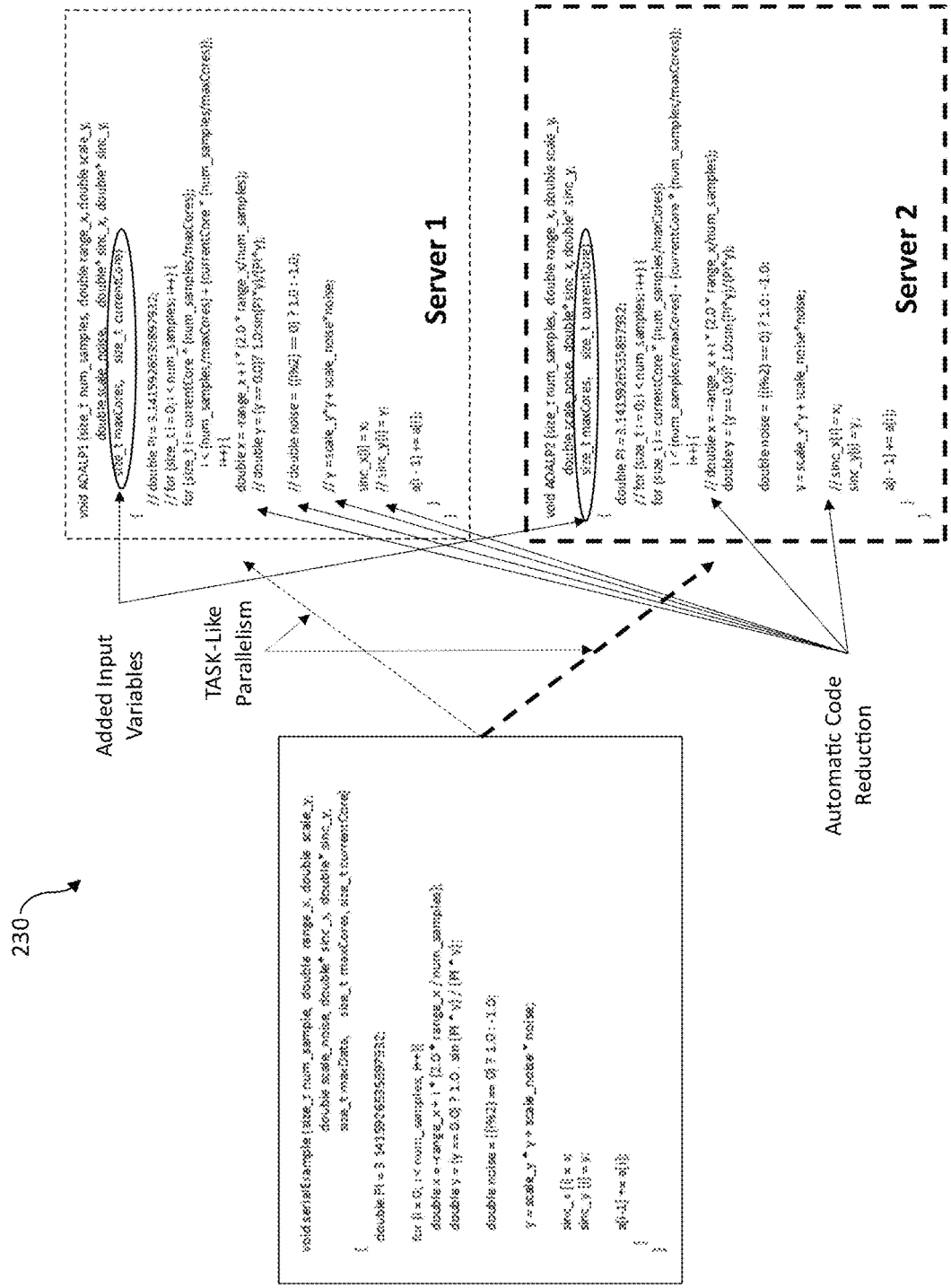
FIG. 9 is an example of an application software code decomposed into A-OALPs, highlighting the code changes needed to perform task-like parallelization, in accordance with embodiments of the present invention.

FIG. 9 shows a software code diagram 230 detailing an A-OALP parallelization code setup. Here, an example algorithm is first decomposed into A-OALPs. This allows for the task-like parallelism that is inherent to A-OALPs, shown as dashed and thick-dashed rectangles in the figure. By definition there is no logical connection between the A-OALPs, allowing them to be processed simultaneously. This lack of logical connection also means that each A-OALP can be efficiently executed on separate, possibly geographically dispersed servers. For each A-OALP (which may be on a separate server), the code that supports variables that do not support the A-OALP's output variable are removed. This has the effect of increasing the code's performance by removing extraneous processing, a capability not possible using known TALPs processes and techniques.

Even though each A-OALP can be executed on a separate server there is never any cross-communication required between different A-OALPs on different servers. The only cross-communication that may be required occurs within a single server. This multi-server cross-communication simplification is not possible using known TALPs processes and techniques.

Figure 10:
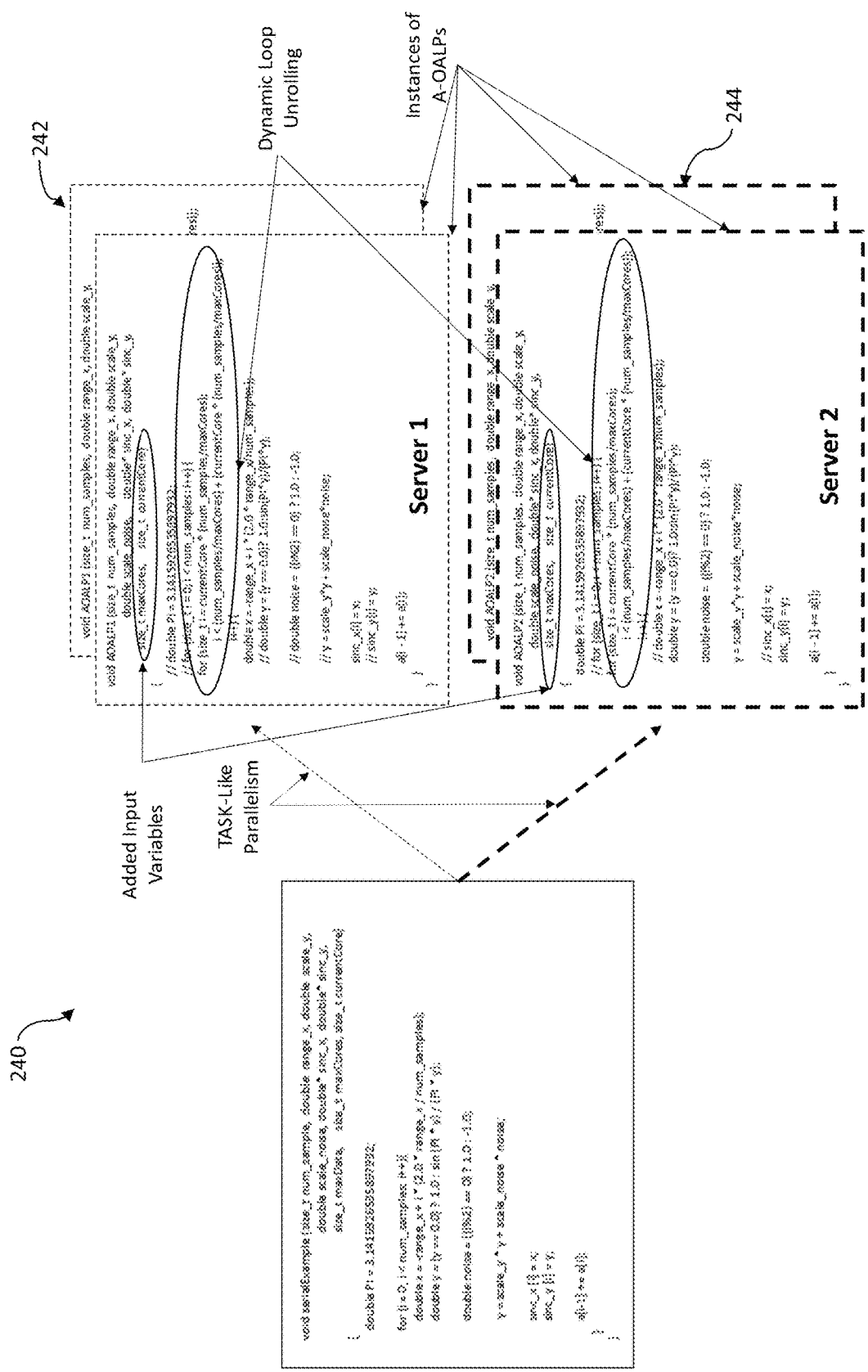
FIG. 10 expands on FIG. 9, showing an example of a software application code converted into multiple parallel execution instances by showing combined task-liken and dynamic loop unrolling parallelization, in accordance with embodiments of the present invention.

FIG. 10 is a diagram 240 showing the application of dynamic loop unrolling parallelism on each A-OALP from FIG. 9. Since each server can contain multiple cores (or other processing elements), the A-OALPs can be further parallelized using known TALPs dynamic loop unrolling parallelization. There are two new input variables added at runtime to each A-OALP: maxCores and currentCore. Both new input variables are required for dynamic loop unrolling parallelization.

The first new input variable, maxCores, is determined from an analysis of $\text{maxCores}_{time}$ and maxCores space as discussed below. The determination of $\text{maxCores}_{time}$ was discussed for FIG. 8B.

The value of $\alpha_1$ divided by the smallest possible value of $\alpha$, $\alpha_{min}$, which occurs where the number of A-OALP loop iterations is one, gives the maximum possible number of cores, $\text{maxCores}_{time}$. This means that the absolute minimum value of $\alpha_1$ is on each core, that is:

Advanced space complexity predicts heap memory (a subset of RAM) allocation. First, the general form of advanced space complexity is shown.

Equation 4: General A-OALP-Based Advanced Space Complexity Curve Fit

Given:

$$m_n = \frac{m_1}{n} \to n = \frac{m_1}{m_n}$$

Where: n= # of cores, $m_1$=Input variable attribute value that affects heap memory allocation, on a single core The value of $m_1$ divided by the smallest possible value of m, $m_{min}$, which occurs where the amount of heap memory allocation is the minimum valid allocation (sufficient memory to execute the A-OALP for the smallest valid input dataset), gives the maximum possible number of cores, $\text{maxCores}_{space}$. This means that the absolute minimum value of $m_1$ is on each core, that is:

$$m_1 = m_{min} = \frac{m_1}{\text{maxCores}_{space}} \to \text{maxCores}_{space} = \frac{m_1}{m_{min}},$$

if f n=the absolute maximum # of cores

This gives the least amount of memory (space) per core, that is, the non-general advanced space complexity is:

$$\mathbf{2} \times \text{units} = \mathbf{2}\left(\frac{m_1}{m_{min}}\right) \times \mathbf{2}_{min} \times \text{units} = \mathbf{2}(\text{maxCores}_{space}) \times \mathbf{2}_{min} \times \text{units}$$

Typically, the maximum cores that it is possible to spread "m" memory allocations across is not the number of cores that are available. If the maximum number of cores that are available for processing is $p_{max}$ then memory allocation can be scaled by scaling the input to the advanced space complexity curve fit as follows:

$$v_m\Big|_{=1 \leftrightarrow \text{maxCores}_{space} \leq p_{max}}^{= \frac{\text{maxCores}_{space}}{p_{max}} \leftrightarrow \text{maxCores}_{space} > p_{max}},$$

Thus, General Advanced Space Complexity is Obtained:

$$\mathbf{2} \times \text{units} = \mathbf{2}(v_m \times \text{maxCores}_{space}) \times \mathbf{2}_{min} \times \text{units},$$

Where: $\mathbf{2}_{min}$=Minimum heap memory allocation detected while curve fitting space value, $\mathbf{2}$=Heap memory allocation from curve fit $v_m$=Scale factor to generalize the spatial complexity curve fit for spatial variable "m", $\text{maxCores}_{space}$=Maximum number of cores supported by input spatial variable value, $\mathbf{2}(v_m \times \text{maxCores}_{space})$=Advanced scaled spatial complexity curve fit, general freeup, $p_{max}$=Maximum number of cores currently available, units=Spatial units (e.g., bytes, MBs, GBs, etc.).
It should be noted that:
if $$p_{max} < \text{maxCores}_{space}$$

then $$\text{maxCores}_{space} = p_{max}$$

Therefore, given the temporal and spatial limitations as shown above, the number of usable cores, maxCores, for an input dataset executing in a given A-OALP on some given hardware system is the smaller of $\text{maxCores}_{time}$ and $\text{maxCores}_{space}$.

The second new input variable, currentCore, is an index that identifies which core (or other processing element) is currently being processed. As can be seen in FIG. 10, this modifies the starting and ending loop values which change the number of loop iterations used by the current instance of the current A-OALP. Because the example shown in FIG. 10 has two output variables, sinc_x and sinc_y, there are two A-OALPs 242, 244 (shown here in dashed and thick-dashed rectangles). Each of these two A-OALPs is then shown with multiple instances. Thus, total number of processing instances for the algorithm is twice what would be available for a TALP, showing the clear parallelism advantage of A-OALPs over TALPs.

Figure 11:
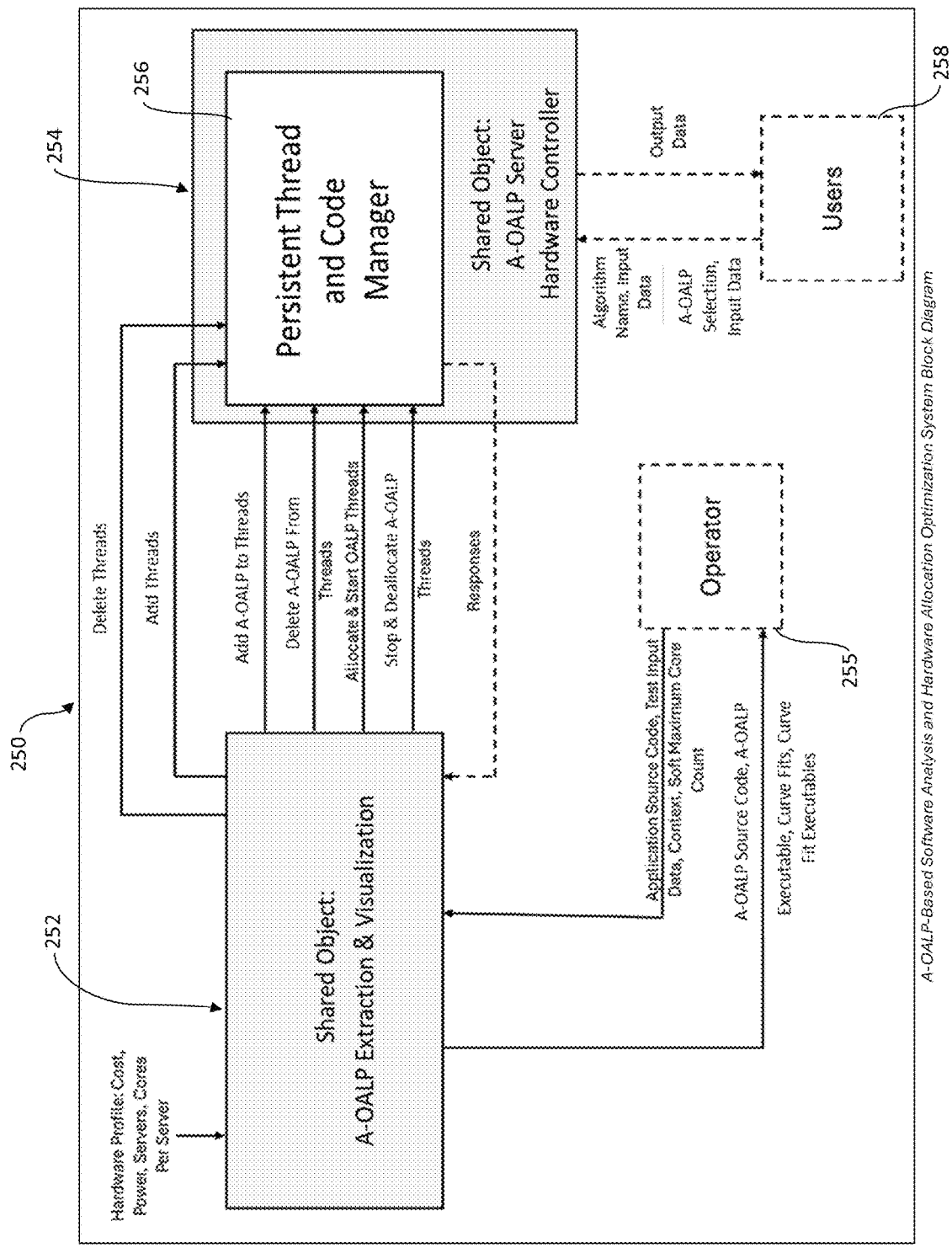
FIG. 11 is a block diagram showing an example system that extracts A-OALPs and their associated analytics from an algorithm and generates the thread-based executable code that controls an A-OALP-based software analysis and hardware allocation optimization system, in accordance with embodiments of the present invention.

FIG. 11 is a block diagram 250 of an example of a complete A-OALP-based runtime combined hardware, software, and dataset optimization system. The two primary components of the system are the A-OALP Extraction and Visualization 252 and the A-OALP Server Hardware Controller 254. The A-OALP Extraction and Visualization component 252 is not run on the target server but instead executed separately on a workstation. This component can perform A-OALP decomposition (the extraction of A-OALPs from algorithms), dynamic parallelization, inherent analytics generation, and system modeling. In contrast, the A-OALP Server Hardware Controller component 254 runs on the target server hardware. This component receives the input dataset for the application, automatically selects the correct set of A-OALPs for parallel execution and determines from the input dataset and available hardware (memory, cores, etc.), the resource allocation required to meet the overall goals set by the operator 255. Operator goals include optimizing for performance, energy use, processing cost, memory use, carbon footprint, and, when required, water consumption.

The hardware controller 254 can execute as a completely independent software entity or as a service. The service model increases the overall processing efficiency of the system but decreases the overall system flexibility. The primary difference between the independent and the service models is how the thread pools are managed via the persistent thread and code manager 256. For the independent model, A-OALPs with their associated prediction analytics are loaded into a persistent thread pool every time they are needed. In the service models, the A-OALPs with their associated prediction analytics are generated once and both the threads and the code are re-used, i.e. persistent. In addition to the operator 255, the figure also shows "users" 258 that can actively request that a dataset be processed using some algorithm. The user is also the recipient of the results of the processing. It should be noted that "users" can be humans, other computer systems, sensor arrays, or any other process used to activate an algorithm.

Figure 12:
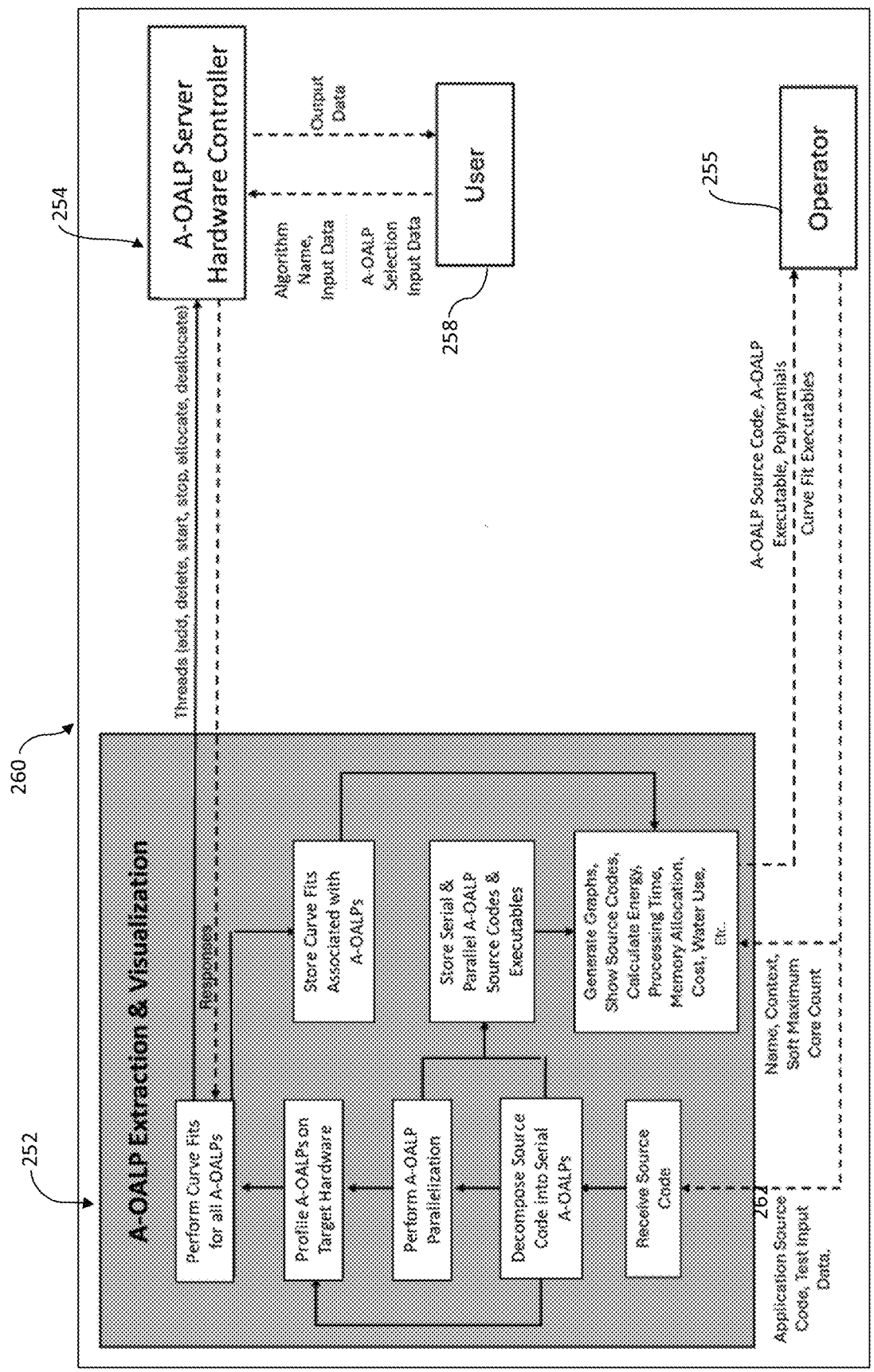
FIG. 12 is a diagram that highlights the A-OALP extraction and visualization component of the example system that generates A-OALPs, parallelizes the A-OALPs, and generates the curve fits for the prediction analytics, in accordance with embodiments of the present invention.

FIG. 12 is a block diagram 260 that details the A-OALP Extraction and Visualization component 252. As can be seen, the operator 255 transmits to the system application source code, algorithms, processes, software modules or functions, test input data, and any soft constraints 262. A soft constraint is a limitation given by the operator 255 that is not inherent to the actual hardware. For example, a server may have forty cores, but the operator 255 will only allow ten cores to be assigned to any given application, an example of $p_{max_{soft}}$. In this component, the received source code, algorithms, processes, software modules, or software functions are decomposed into various A-OALPs. The code of each A-OALP is configured to manage the runtime generation of instances so that the A-OALP can be parallelized using the dynamic loop unrolling parallelization method. There are two forms of A-OALPs: serial and parallel. Serial A-OALPs represent the single instance version of the pathway. This is a novel view of serialism since the task-like parallelism that is inherent to A-OALPs is still present, but only as single instances. This task-like parallelism occurs by the very nature of an A-OALP. With the code configured to manage multiple parallel instances of an A-OALP, task-like parallelism is automatically combined with dynamic loop unrolling parallelism to give A-OALP technology a marked advantage.

A-OALP-based code analysis expressly ties the input variable attributes that affect the loop iterations within an A-OALP to produce a curve fit, allowing for scaled processing time prediction (advanced speedup). Un-scaling predicted scaled processing time converts it into processing time, given by advanced time complexity. Predicted scaled and un-scaled processing time prediction can be performed for both the serial A-OALPs and the parallelized A-OALPs. An analogous tying of input variables to memory allocation makes it possible to generate scaled and un-scaled memory allocation predictions, which is analogous to recognized freeup and advanced space complexity.

Figure 13:
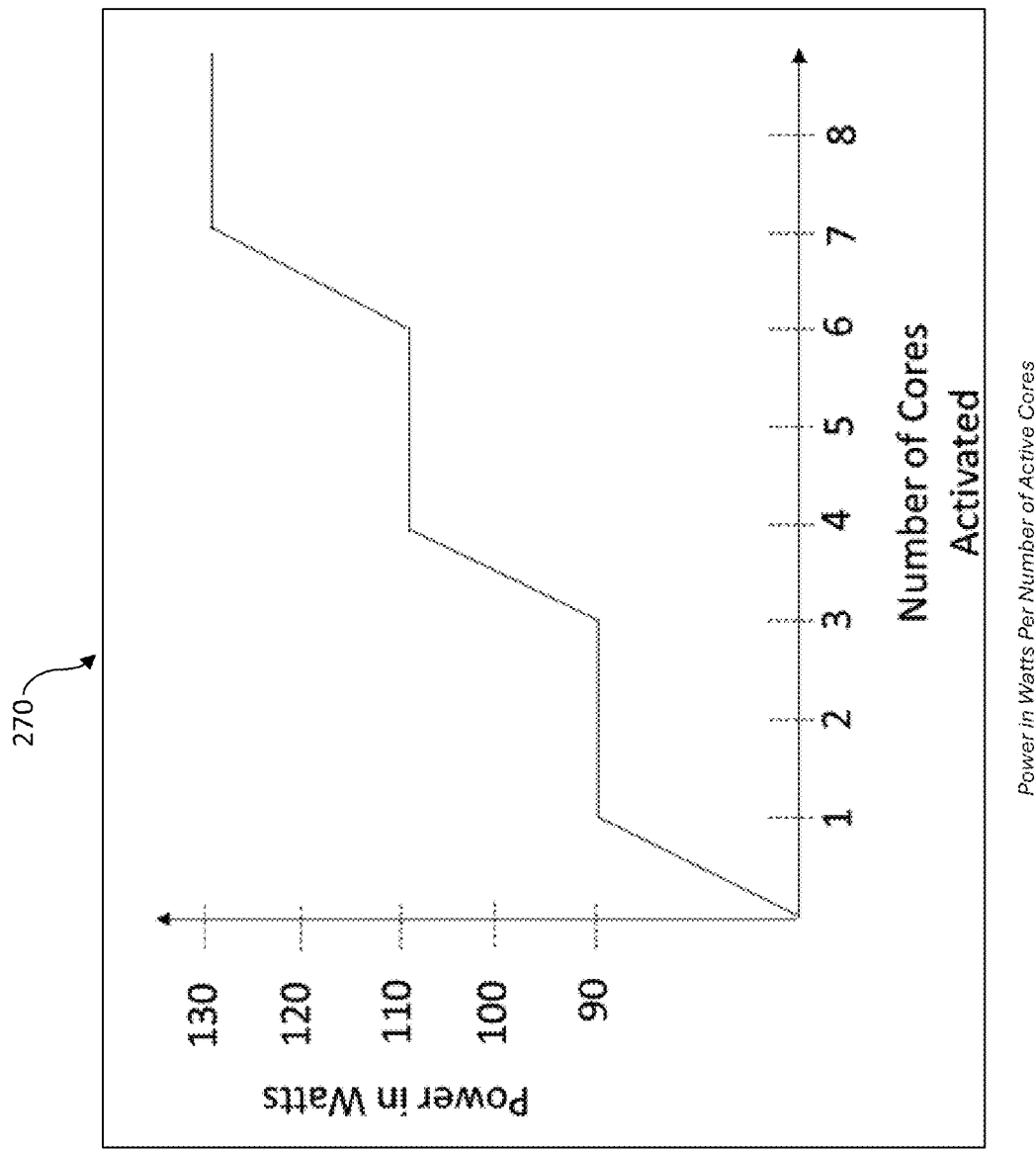
FIG. 13 is a graph showing an example relationship between the number of cores actively processing a parallelized algorithm and the power consumption in watts, in accordance with embodiments of the present invention.

FIG. 13 shows an example graph 270 of the power consumption (in watts) of a server as the number of cores in that server are varied. Generally, power consumption does not change linearly with the number of cores being used to process an algorithm. This means that energy use, energy=(power×time), also varies non-linearly. It should be noted that in many cases, the power consumption of a greater number of active cores can be the same as some lesser number of active cores. This offers opportunities to optimize energy use by managing the number of parallel cores used to process an A-OALP. The greater parallelism afforded by A-OALPs means better energy management of an algorithm can be achieved over that which can be achieved by TALPs.

Figure 14:
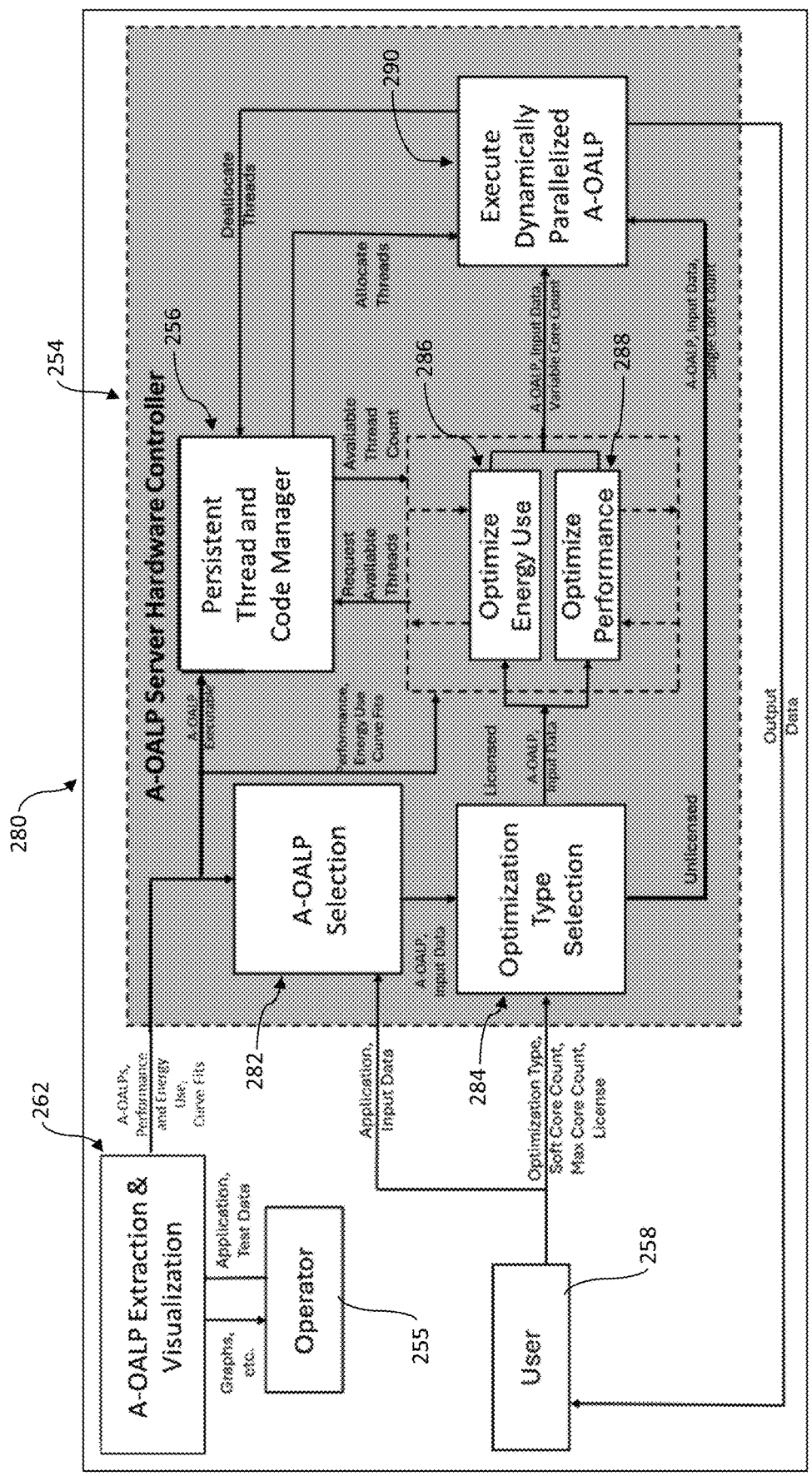
FIG. 14 is a diagram that highlights the A-OALP server hardware controller component of the example system that selects the threads that correspond to cores and optimizes the configuration of the hardware for energy or performance, given a particular set of A-OALPs and an input dataset, in accordance with embodiments of the present invention.

FIG. 14 is a block diagram 280 that details the A-OALP Server Hardware Controller component 254 of the system. As can be seen, this component consists of the following subcomponents: A-OALP selection 282, optimization type selection 284, persistent thread and code manager 256, optimize energy use 286, optimize performance 288, and execute dynamically parallelized A-OALP 290.

The A-OALP selection subcomponent 282 contains the A-OALP Selection table as shown in FIG. 5. This table contains algorithm names, pathway names, pathway selection conditions, temporal variables, spatial variables, A-OALP names, and the output variable names and types. The algorithm names are the names used to identify the overall application. Standard tests to ensure that the input variables are correct for the selected application are performed. The input variable values that correspond to the path selection conditions are compared to the table section associated with the named application. The A-OALP that corresponds to the found pathway is identified for execution.

The optimization type selection subcomponent converts various optimization types, such as performance, memory allocation, energy consumption, processing cost, water consumption, and carbon footprint (pounds of $CO_2$ generated), into only two optimization types: energy consumption and processing performance.

Since energy=(power×time), using the general advanced time complexity calculation from Equation 1 and the definition of power for a set of active cores, the energy use, given a parallelized A-OALP, is derived as:

Equation 5: Energy Use Per A-OALP with a Maximum Number of Active, Parallel Cores $$e \times \text{joules} = (p \times \text{watts} = \text{power(cores)}) \times$$
$$(t \times \text{seconds} = T_{A-OALP}(v_a \times maxCores_{time}) \times t_{min} \times \text{seconds}) =$$
$$p \times \text{watts} \times t \times \text{seconds} = \frac{p \times \text{joules}}{\text{second}} \times t \times \text{seconds} = (p \times t) \times \text{joules}$$

Where: power(cores)=Watts per number of active cores

The electrical cost of executing an application on some piece of computing hardware is a function of the electricity provider's charges, which can vary with the service provider, location, season of the year, the day of the week, and the presence of various holidays.

Equation 6: Cost Per A-OALP Per Input Dataset $$\text{dollars}=e \times \text{cost(provider,location,season,day,holiday)}$$

Analogous to the electrical cost calculation, the liters of water used by an application on computing hardware is a function of the infrastructure of that hardware. Some computing infrastructure uses water for cooling, and other computing infrastructure either mitigates water use or does not require water for cooling at all. The water use must be separately profiled as a function of energy use, giving:

Equation 7: Water Use Rate Given Computing Infrastructure and Location $$\text{literRate(infrastructure, location)} = \frac{\text{liters}}{\text{second}}$$

Since the amount of water used for cooling purposes is water=energy×rate, the following calculation is obtained:

Equation 8: Current Execution Water Consumption $$\text{water}=e \times \text{literRate(infrastructure,location)}=\text{watt-liters}$$

Another analog to the electrical cost calculation is the carbon footprint calculation. The carbon footprint represents the number of pounds of carbon dioxide ($CO_2$) created while generating the electrical energy used to execute an algorithm on some piece of computing hardware. This, like cost, is a function of the electrical service provider's local power generation method and can vary with the service provider's location.

Equation 9: $CO_2$ Generation Rate Given Service Provider's Location $$\text{footprintRate(location)} = \frac{CO_2 \text{ pounds}}{\text{seconds}}$$

Since the amount of $CO_2$ generated for an A-OALP is $CO_2$=energy×generation rate, the following calculation is obtained:

Equation 10: Current Execution Carbon Footprint $$CO_2=e \times \text{footprintRate(location)}=\text{watt-pounds}$$

Since processing time is the basis of energy consumption and since cost, water use, and $CO_2$ generated are functions of energy use, only processing time and energy use are required for optimization purposes.

Unlike advanced time and space complexity, which only rely on how an algorithm behaves while executing on some hardware, energy use also depends on the power use per core. To obtain power use per core, the target hardware is profiled by sequentially activating the cores and measuring the power use.

The prediction curve fits associated with the A-OALP allow for the prediction of time or memory allocation based on input variable attribute values, available hardware values, and the operator's goals and are used either in a model to determine what-if scenarios or in the direct allocation of hardware in the target server, that is, the number of cores. It should be clear that the A-OALP Extraction and Visualization analysis must be performed every time the application source code, algorithms, processes, software modules, or functions, or the target server is changed.

This conversion of cost, water use, and carbon footprint into either processing performance or energy use is performed in the "optimization type selection" subcomponent 284. The "persistent thread and code manager" subcomponent 256 combines the A-OALP executable code with threads and associated cores. The "optimize energy use" subcomponent 286 emphasizes energy consumption over performance. This is performed by allocating the maximum number of cores that are available, which consumes the minimum amount of energy. The number of cores available equals the number of unallocated cores for the server so long as that number is less than or equal to the soft core count limit. The "optimize performance" subcomponent 288 allocates the maximum number of cores that are available, and both continues to positively increase performance and is less than or equal to the soft core count limit. It should be noted that the "optimize energy use" 286 and "optimize performance" 288 subcomponents are only used if the system is currently under license; otherwise, only a single core is allocated for the A-OALP. The "execute dynamically parallelized A-OALP" subcomponent 290 is used to activate and execute all allocated parallel threads that correspond to separate unused cores.

Figure 15:
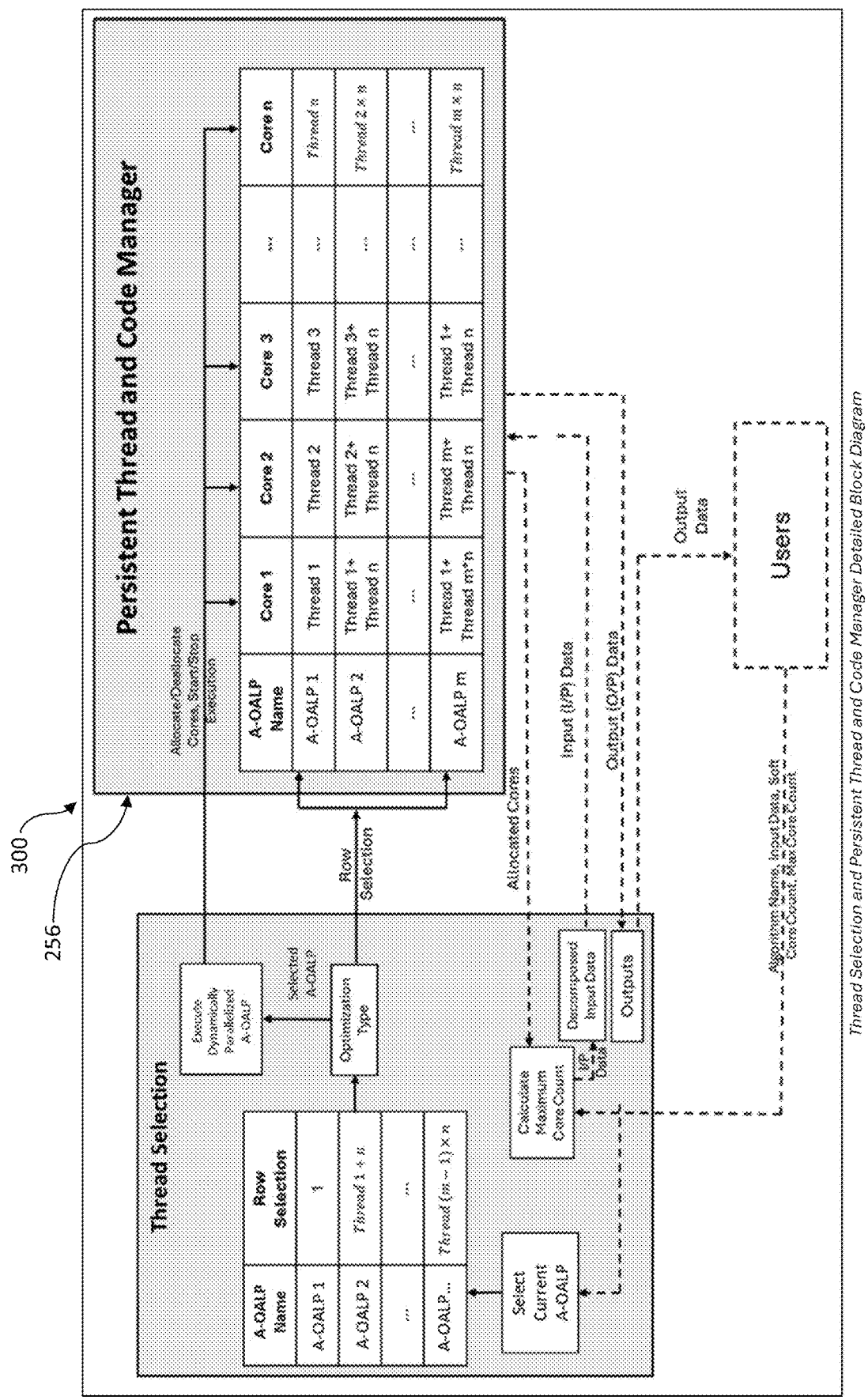
FIG. 15 is a block diagram showing an example of the detail of both the thread selection and the A-OALP persistent thread and code manager subcomponents of FIG. 14, in accordance with embodiments of the present invention.

FIG. 15 is a detailed diagram 300 showing that the "persistent thread and code manager" subcomponent 256 stores an in-memory copy of all A-OALPs that are to be executed on the current server. Consider that for multicore CPU-type processors, each core can be associated with an execution thread without processor over-subscription. Associating a thread with a core is a function of the order that the threads are created in. For example, if three threads are generated in the following order: $thread_0$, $thread_1$, and $thread_2$, then $thread_0$ will be assigned to $core_0$, $thread_1$ will be assigned to $core_1$, and $thread_2$ will be assigned to $core_2$. Shown here, each core can contain multiple A-OALPs. However, only one A-OALP at a time can be executed on a given core. This serves to ensure that there is no core over-subscription; that is, no hyper-threading is performed as this would decrease the overall parallel performance of the A-OALP.

Figure 16:
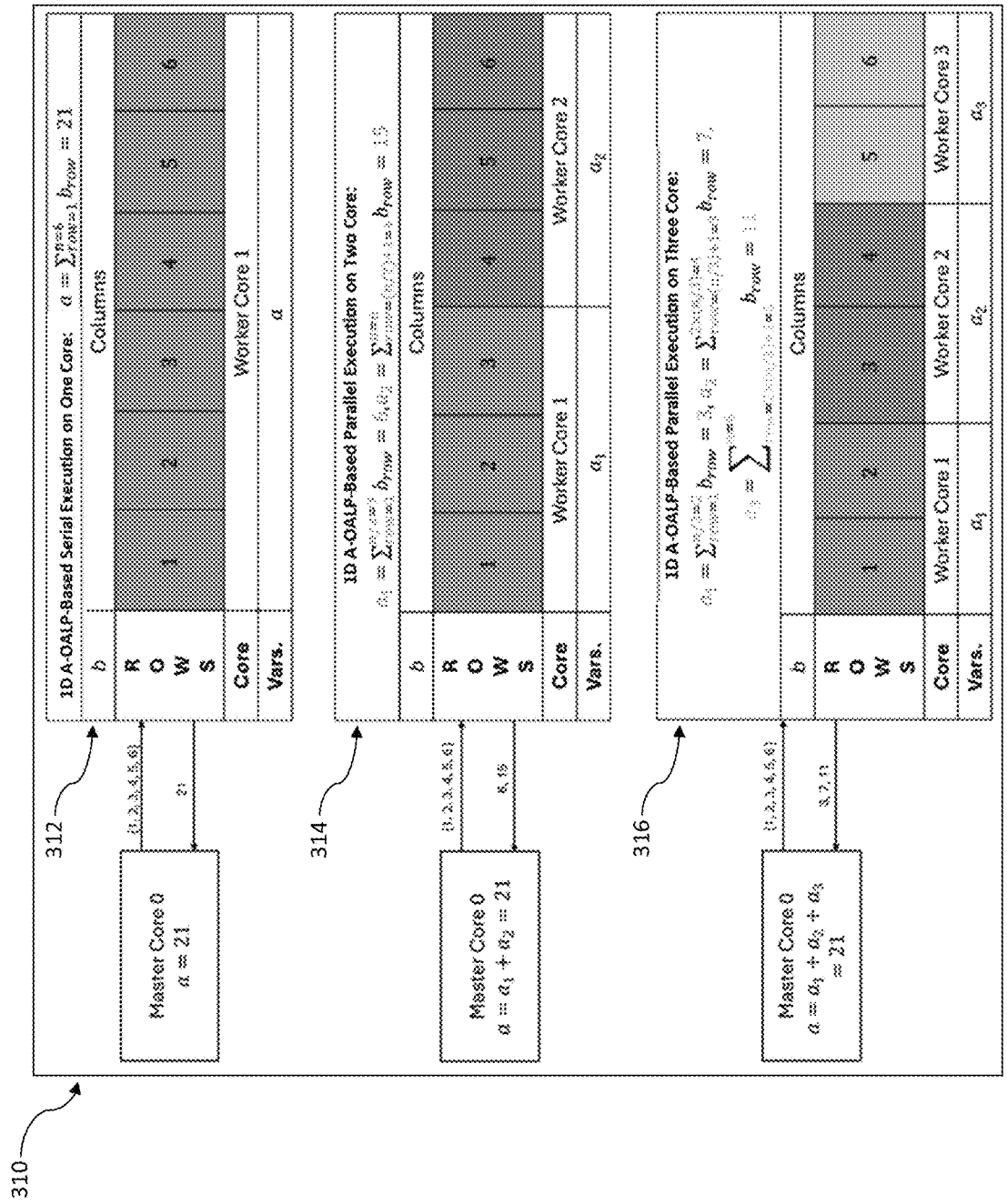
FIG. 16 is a diagram showing the memory layout of multiple instances of an A-OALP (parallel computational workers) for serial, two-core, and three-core single-loop parallelization, in accordance with embodiments of the present invention.

FIG. 16 shows a diagram 310 of a single loop algorithm with A-OALP-based dynamic single-loop unrolling parallelization using a single input variable attribute to perform the parallelization. In this case a single input variable attribute (row) controls the loop iterations of array b. Since there is only one input that is also the output variable b then it represents an A-OALP. The first part of the diagram 312 shows the serial algorithm, that is, the algorithm executing on a single core. In the parallel regime, a worker is an instance of the algorithm, in this case an A-OALP, executing on a single processing thread. In the model herein, a processing thread is always mapped to a single core. The second part of the diagram 314 shows the algorithm executing on two cores, and the third part of the diagram 316 shows the algorithm executing on three cores.

Figure 17:
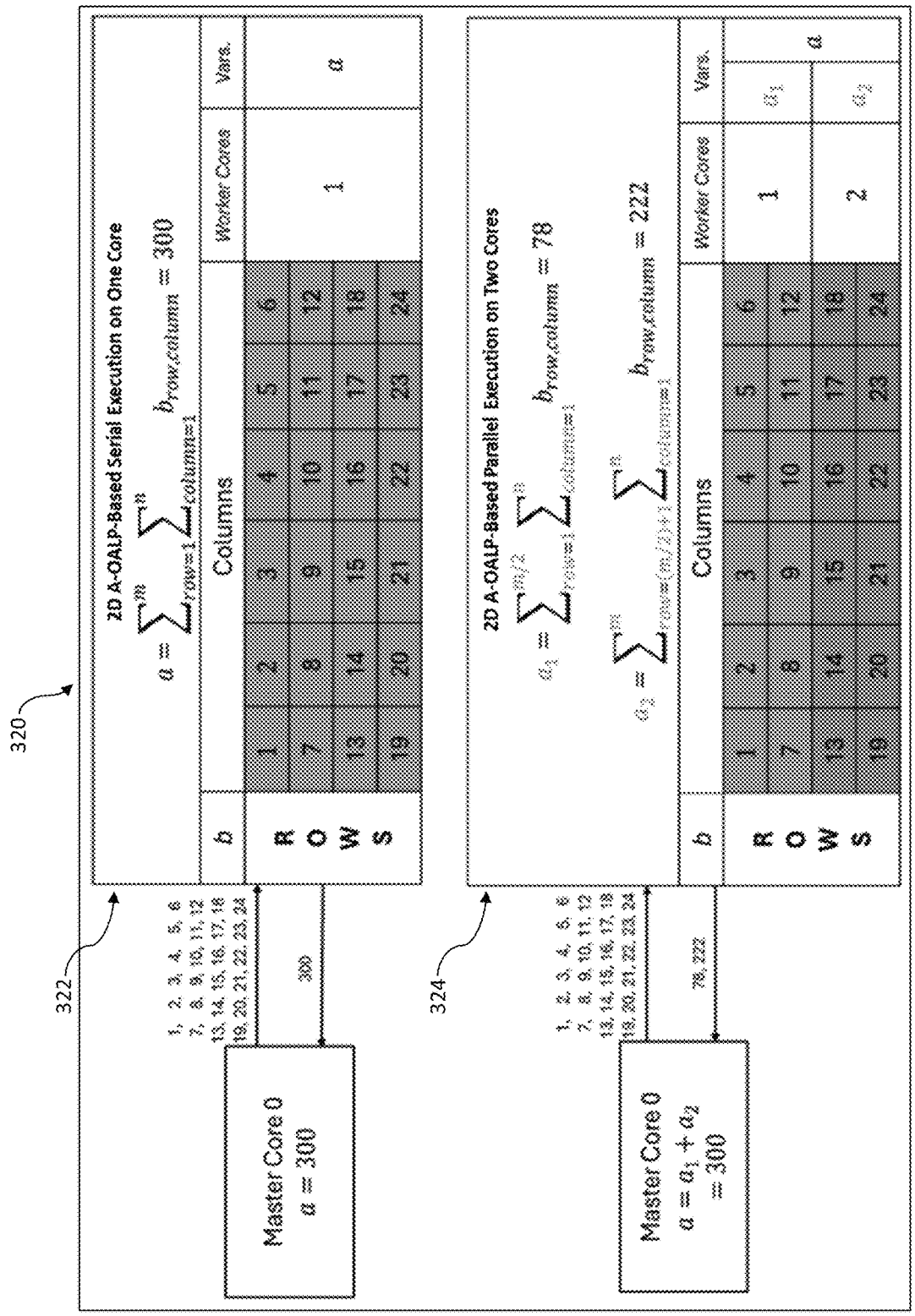
FIG. 17 is a diagram showing the memory layout of multiple instances of an A-OALP (parallel computational workers) for serial and two-core hierarchical loop parallelization, where only the outer loop is parallelized, in accordance with embodiments of the present invention.

FIG. 17 shows a diagram 320 of an algorithm with two hierarchical loops using A-OALP-based dynamic single-loop unrolling parallelization. As with FIG. 16, the first part of this diagram 322 shows the serial version of the algorithm executing on one core, and the second part of the diagram 324 shows the algorithm executing on two cores. Unlike FIG. 16, which only splits the data in one dimension (row), this figure shows that the data is split in two dimensions, both row and column. It should be noted that only the rows are used to define the work of the cores; that is, parallelization is for the outer loop only and consists of the placement of worker instances on separate cores, each parallelized by changing the starting and ending loop indexes of the outer loop. Each instance is called a worker thread. Since parallelization is for the outer loop only, the maximum parallel speedup is linear.

Figure 18:
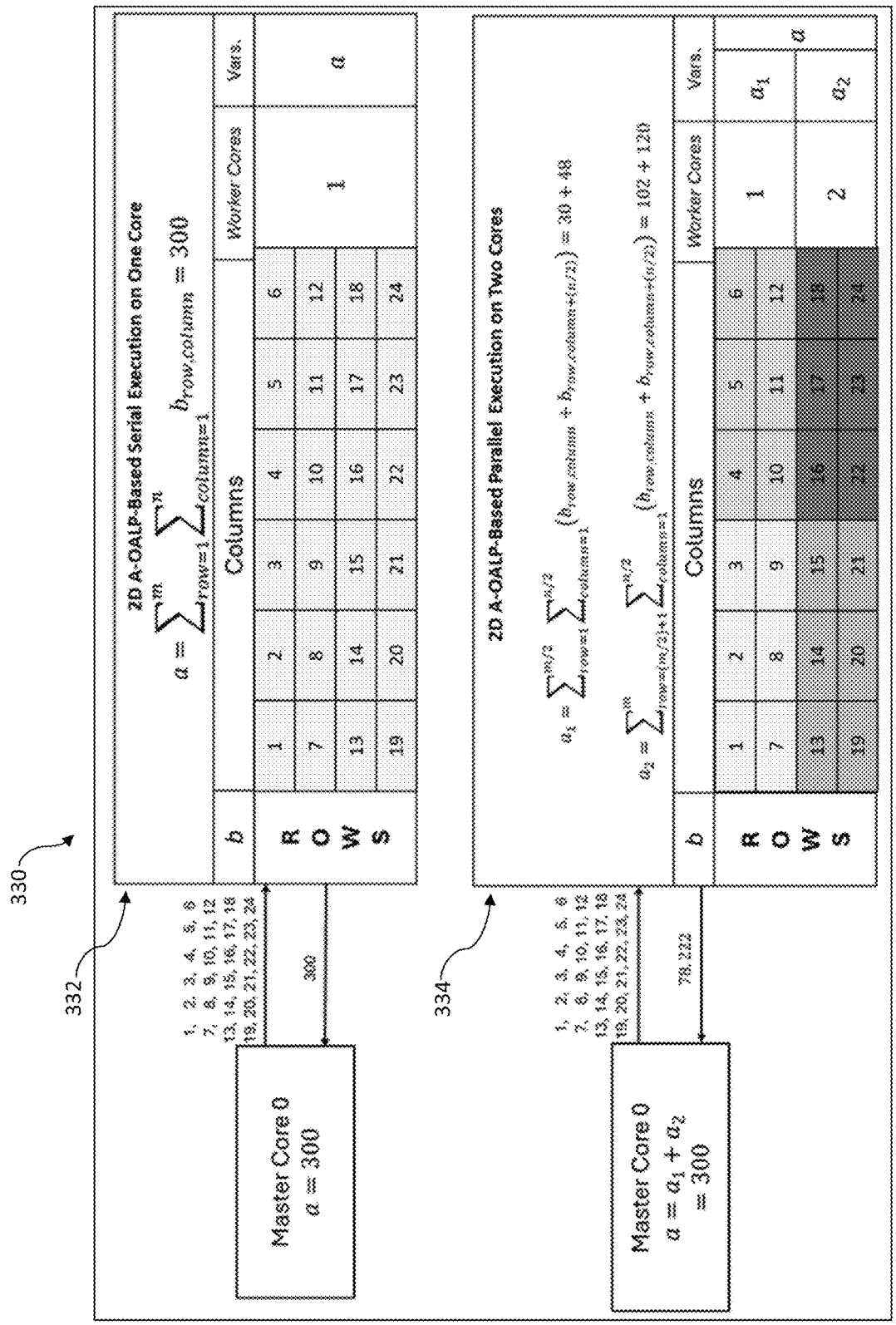
FIG. 18 is a diagram showing the memory layout of multiple instances of an A-OALP (parallel computational workers) for serial and two-core hierarchical loop parallelization, where all hierarchical loops are parallelized simultaneously, an extension of dynamic loop-unrolling parallelization that greatly increases the parallel performance of the system, in accordance with embodiments of the present invention.

FIG. 18 shows a diagram 330 of an algorithm with two hierarchical loops, this time using the A-OALP-based dynamic multiple, hierarchical loop parallelization method. The first part of the diagram 332 shows the serial case. The second part of the diagram 334 first shows the rows (gray and dark gray areas) split among two cores (dynamic loop unrolling parallelization) and then each row is shown to be further split (using static loop unrolling, a type of vectorization). Static loop unrolling removes unnecessary loop checks, thereby increasing the performance of the dynamic loop unrolling parallelization. This means that it is possible to have both static and dynamic loop unrolling occur simultaneously for the same looping structures. This A-OALP-based dynamic all-loop unrolling parallelization gives greater than linear speedup.

Figure 19:
FIG. 19 is a diagram showing the memory layout of multiple instances of an A-OALP (parallel computational workers) for serial and "n"-core hierarchical loop parallelization, where all hierarchical loops are parallelized simultaneously. This is the general hierarchical all-loop parallelization model, in accordance with embodiments of the present invention.

FIG. 19 shows a diagram 340 of a general version of the A-OALP-based dynamic all-loop unrolling parallelization shown in FIG. 18. Here, an algorithm with two hierarchical loops is parallelized using "n" cores rather than two cores. The first part of the diagram 342 shows the serial case. The second part of the diagram 344 first shows the rows (graduated gray scale) split among "n" cores (dynamic loop unrolling parallelization) which are then further split using static loop unrolling. It should be noted that the number of times dynamic loop unrolling occurs is the same as the number of cores involved. Therefore, the amount of static loop unrolling, instead of being a function of the number of loops, is a function of the number of cores.

Referring generally to FIG. 20 through FIG. 23, parallel processing has two aspects: work splitting and overhead minimization. Work splitting means that the processing time of an A-OALP is split evenly across multiple cores as the A-OALP is split into multiple concurrent instances. Overhead refers to processing time that is not directly associated with obtaining the A-OALP's output variable. Software can use either the process or thread model of execution. A process refers to both the execution-controlling code and the associated data structures needed by a computer program to run on a computer system. Each process has its own memory and process control block (data structures). The process control block contains the stack pointer, process state, process number, program counter (address of the next instruction to be executed), registers (value of CPU registers), memory limits (page tables, segment tables, etc.), and an open files list. A thread is a part of a process and shares memory spaces and resources with other threads. Each thread has its own thread control block, which contains the thread ID, thread states, program counter, registers, thread priority, process pointers and thread pointers. Since the threads share only memory, stack, process state, and open files, software using this model can process in less time as there is less overhead.

Figure 20:
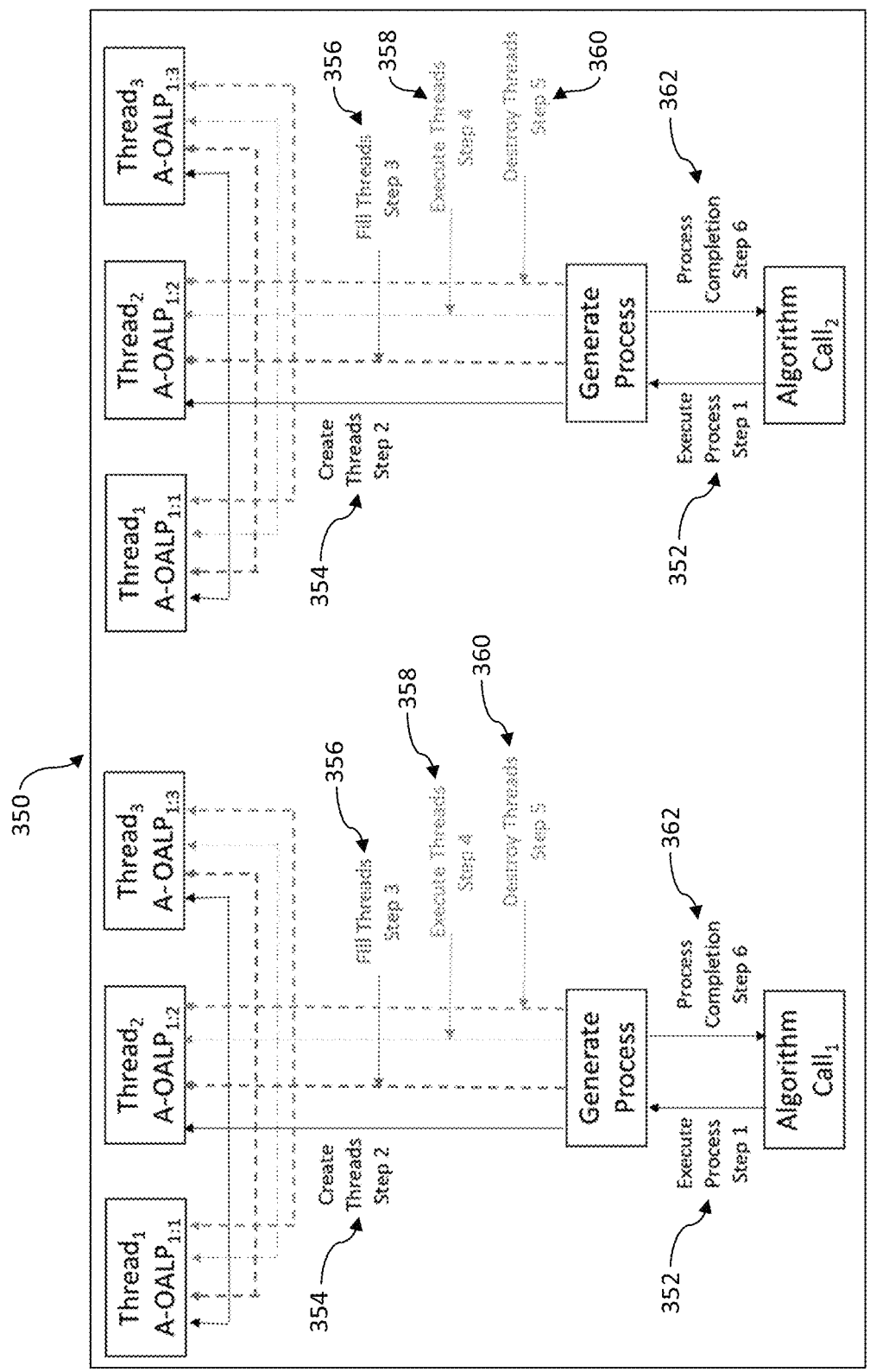
FIG. 20 is a diagram showing an example of two process calls made to a parallelized, multi-instanced A-OALP that uses an un-pooled approach to thread management, in accordance with embodiments of the present invention.

FIG. 20 shows a diagram 350 of a basic, un-pooled approach to thread management. Shown are six exposed steps required to execute a parallel algorithm using this approach. Those steps consist of the following: "execute process" 352, "create threads" 354, "fill threads" 356, "execute threads" 358, "destroy threads" 360, and "process completion" 362. The total overhead processing time is a function of the number of threads created, executed, and destroyed. The "execute process" step 352 is not considered parallel overhead as both serial and parallel codes must perform this step. The "create threads" step 354 takes a given block of code and uses it to generate multiple instances (designated in this figure as 1:1, 1:2, and 1:3 for the three shown instances of A-OALP 1), each of which is placed on a thread that is mapped to a core used in the execution of a parallelized code. The "create threads" step 354 is considered a parallel overhead step because a serial code does not require the separate generation of code instances, nor does serial code require the activation of multiple threads. The threads can be created in any order, and thus thread numbers and core numbers can be different. The "fill threads" step 356 associates an instance of the parallel worker code with a particular processing thread and is considered a parallel overhead step. The "execute threads" step 358 activates the worker threads for parallel execution and is also considered a parallel overhead step. The "destroy threads" step 360 destroys the worker threads (freeing thread-held system resources) after the worker execution has completed. Like the "create threads" step 354, the "destroy threads" step 360 is considered a parallel overhead step. The "process completion" step 362 is not considered parallel overhead as both serial and parallel codes require it to free process-held system resources. It should be noted that the process controls its threads. Un-pooled threads are typically used in task-level parallel processing.

Although it is possible to perform parallel processing without threads, it is very inefficient with modern multicore hardware. The inefficiency stems from the fact that cores are not accessible without threads, meaning that the entire processor (not just a core of a processor) is consumed for each worker instance, greatly decreasing the available parallel resources that can be used by a parallel code.

Figure 21:
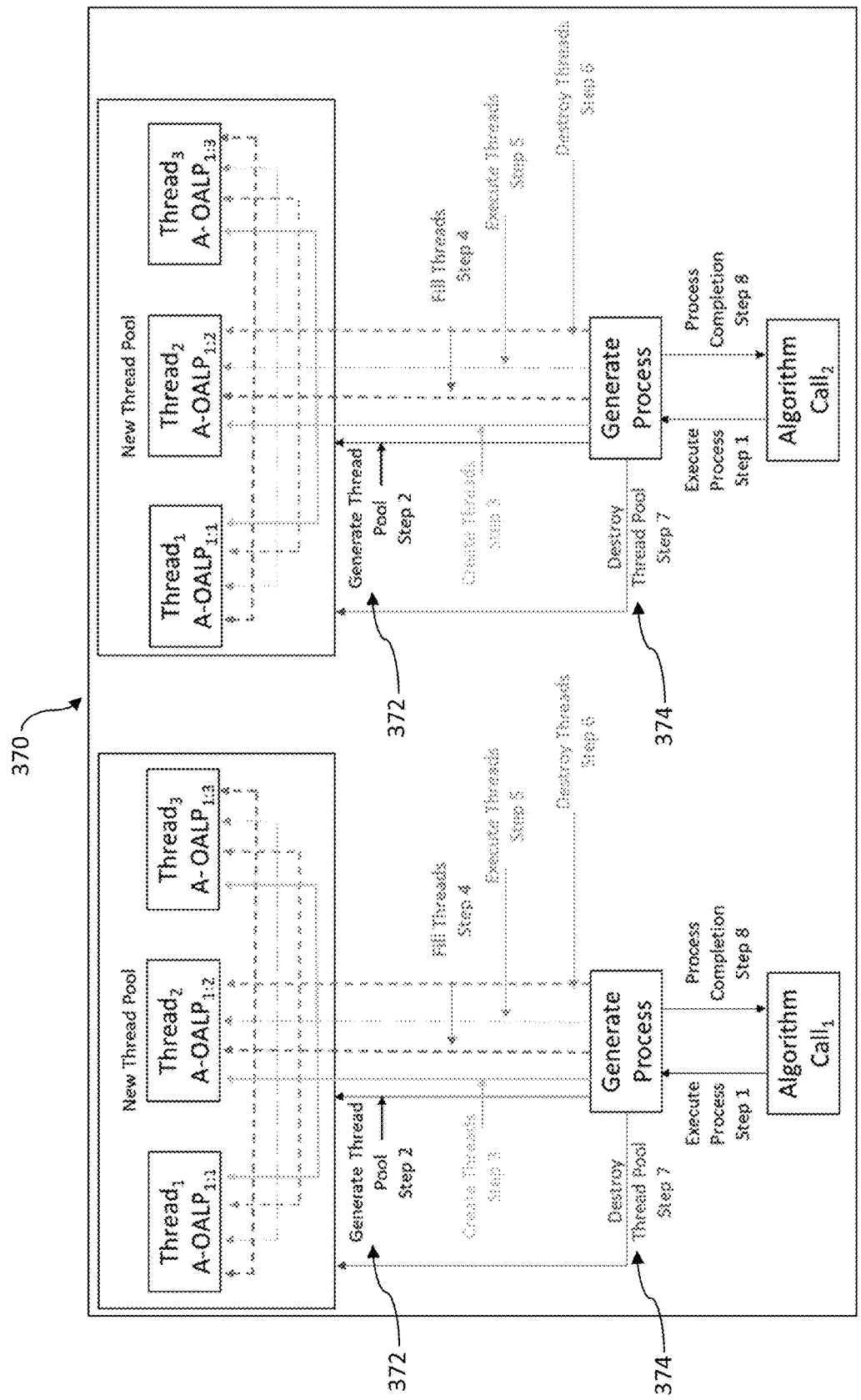
FIG. 21 is a diagram showing an example of two process calls made to a parallelized, multi-instanced A-OALP that uses a pooled approach to thread management, in accordance with embodiments of the present invention.

FIG. 21 shows a diagram 370 of a pooled approach to thread management. Here, a new process and a thread pool are generated every time a new multi-threaded A-OALP (an A-OALP with multiple instances) is executed. This thread management model adds two additional steps to the basic, un-pooled approach discussed for FIG. 20, making a total of eight exposed steps. The exposed additional steps are "generate thread pool" 372 and "destroy thread pool" 374. This type of thread pool does not decrease the amount of parallel overhead when compared to un-pooled parallel threads. This is considered a naïve approach to thread pooling and is only used to teach the general concepts.

A key consideration for thread pools is the fact that any unhandled thread exception error will cause the termination of the underlying process, aborting the entire pool. The types of exceptions that will cause the pool to abort are: "abort," "application unloaded," and "process termination". As long as these exceptions are handled by the underlying process correctly, thread pooling can be safely used.

The "generate thread pool" step 372 sets up the thread-pool processing framework but still requires the threads to be created and filled with an appropriate worker application code. The underlying process controls the thread-pool management. As with un-pooled threads, threads in this case must first be generated in the "create threads" step within the framework. After the threads are created, they are associated with worker codes during the "fill threads" step. The filled threads are then executed in the "execute threads" step. The "destroy thread pool" step 374 safely releases the resources used by the thread pool.

Figure 22:
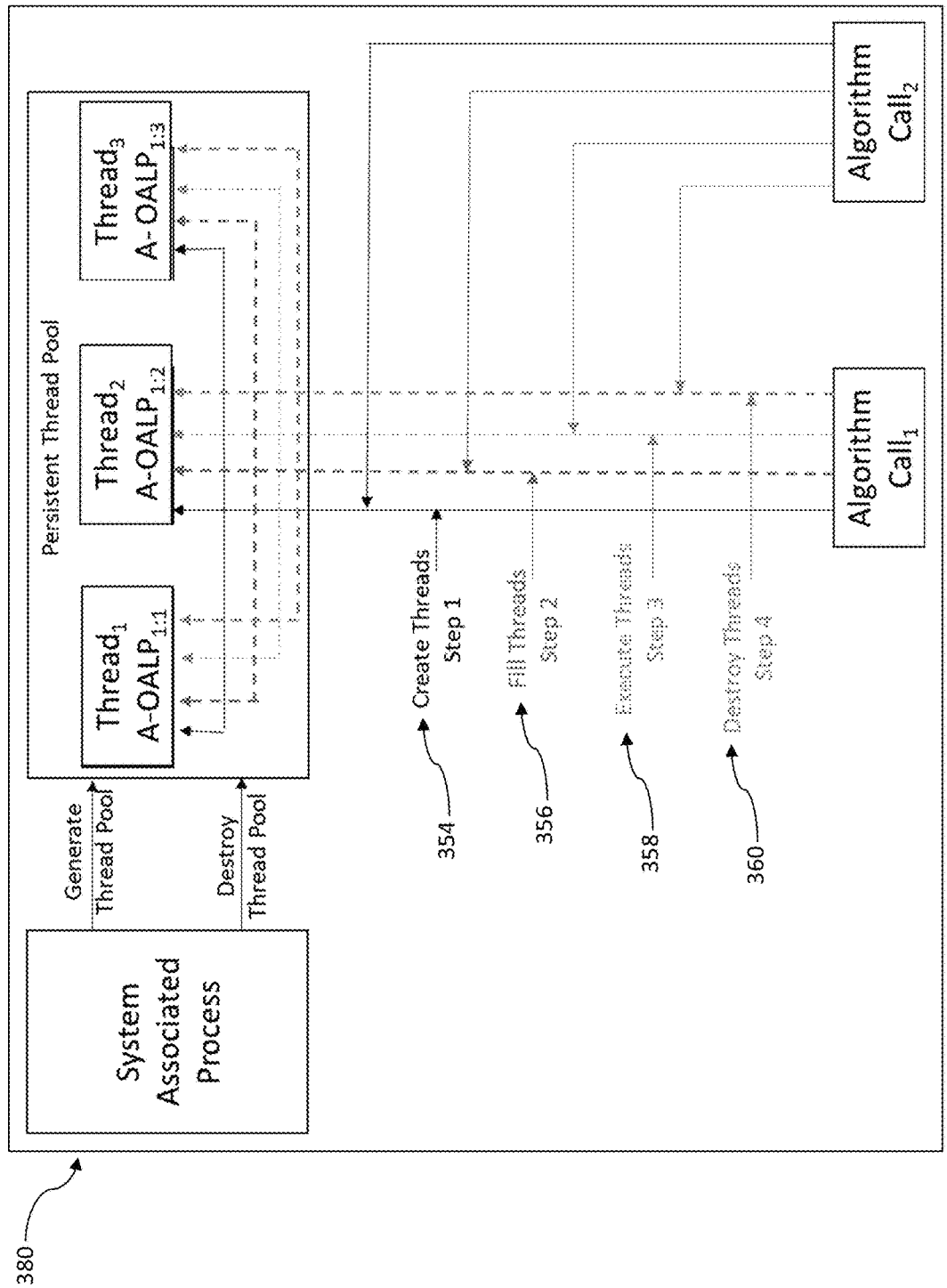
FIG. 22 is a diagram showing an example of two process calls made to a parallelized, multi-instanced A-OALP that uses a persistent thread pool approach to thread management, in accordance with embodiments of the present invention.

FIG. 22 shows a diagram 380 of thread pool-based thread management with a persistent thread pool. Here, neither a new process nor a new thread pool is generated every time a new multi-threaded A-OALP is executed. The thread pool is generated separately from the A-OALPs and is reused after the thread processing is completed rather than being destroyed. Reusing the thread pool removes some of the overhead associated with pooling as the thread pool is generated and destroyed separately from the A-OALP-filled threads. This decreases the algorithm call sequence overhead from eight steps to four steps, "create threads" step 354, "fill threads" step 356, "execute threads" step 358, and "destroy threads" step 360, and gives a marked overhead-decrease advantage over the method shown in FIG. 21. In addition to the overhead from "generate pool thread" and "destroy thread pool" both the "execute process" and "process completion" steps seen in FIG. 20 and FIG. 21 are missing from the algorithm call sequence.

Figure 23:
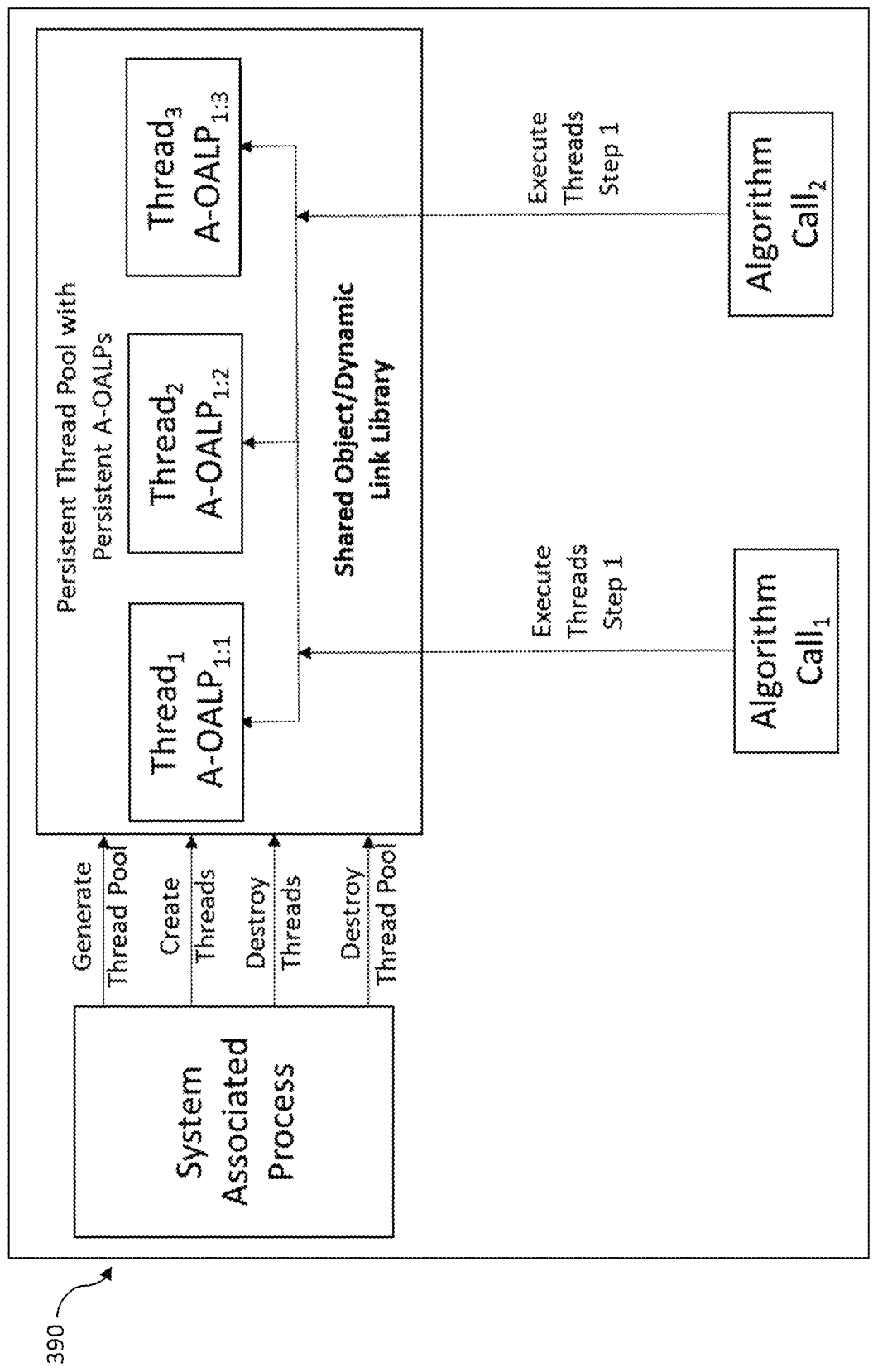
FIG. 23 is a diagram showing an example of two process calls made to a parallelized, multi-instanced A-OALP that uses a current persistent thread pool with a persistent A-OALPs management model, in accordance with embodiments of the present invention.

FIG. 23 shows a diagram 390 of a persistent thread pool with persistent A-OALPs. This model further decreases the algorithm call sequence overhead from the four steps of FIG. 22 to one step "execute threads."

This approach is not recommended for non-A-OALP codes as such codes can require an unwieldy amount of system resources (memory, cache, etc.) to be practical. Since an A-OALP only processes a single output variable along a single processing pathway, its resource requirements are far lower than traditional worker code definitions, which can require multiple pathways and/or multiple output variables. "C" computer language family process groups come in number of forms. However, as shown in the examples here, they all generate a single output variable:

Equation 11: "C" Computer Language Process Group Examples $$y_1 = f(x_1), y_2 = f(x_1, x_2, \ldots, x_n), y_3[b_1][b_2] \ldots [b_m] = f(x_1[\alpha_1][\alpha_2] \ldots [\alpha_m], x_2, \ldots, x_n)$$

Where: $y_1$ = Output for a single input variable,
$y_2$ = Output for multiple input variables,
$y_3 [b_1] [b_2] \ldots [b_m]$ = Output array for multiple input variable and arrays This is not the same as a "process group" in computer science where one or more input variables can generate multiple output variables. Consider that an A-OALP as defined herein also generates a single output variable but can receive multiple input variables. This means that an A-OALP is equivalent to the original intent of "C" computer language group. Thus, it is now possible to decompose an algorithm into a set of process groups that are equivalent to the original intent of "C" computer language family process groups.

Figure 24:
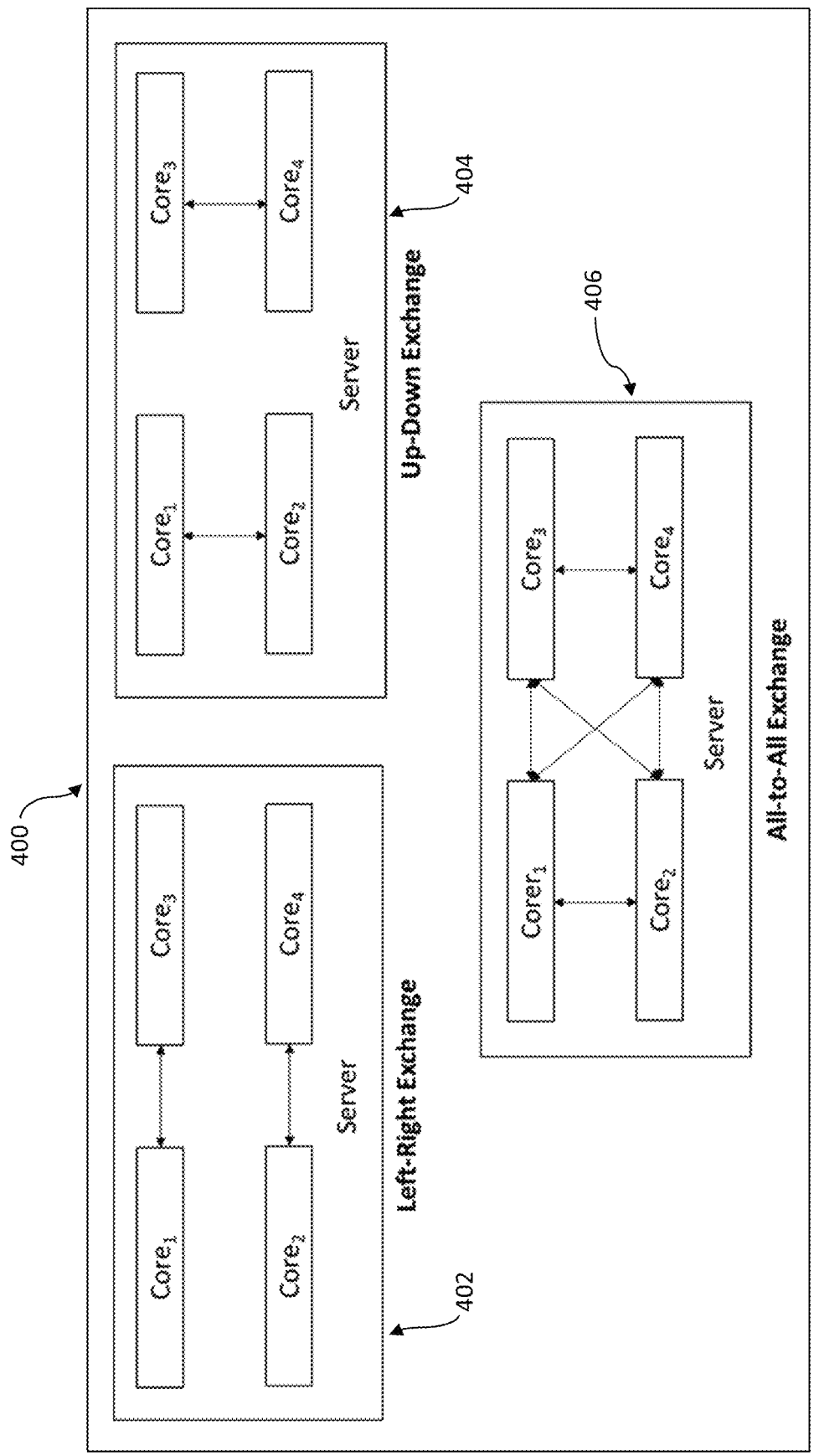
FIG. 24 is a diagram showing examples of single server multicore cross-communication models, in accordance with embodiments of the present invention.

FIG. 24 shows a diagram 400 containing multiple cross-communication methods for A-OALPs. These and other methods are shown in detail by various techniques. Here, the assumption is that the cross communication will be between cores on the same socket of a single server. A socket is an addressable hardware component that holds a single processor. Modern servers typically use multiple sockets. Since all sockets on a given server share the memory, communication between sockets is equivalent to other shared memory models. A left-right exchange 402, an up-down exchange 404, and an all-to-all exchange 406 are illustrated.

Figure 25:
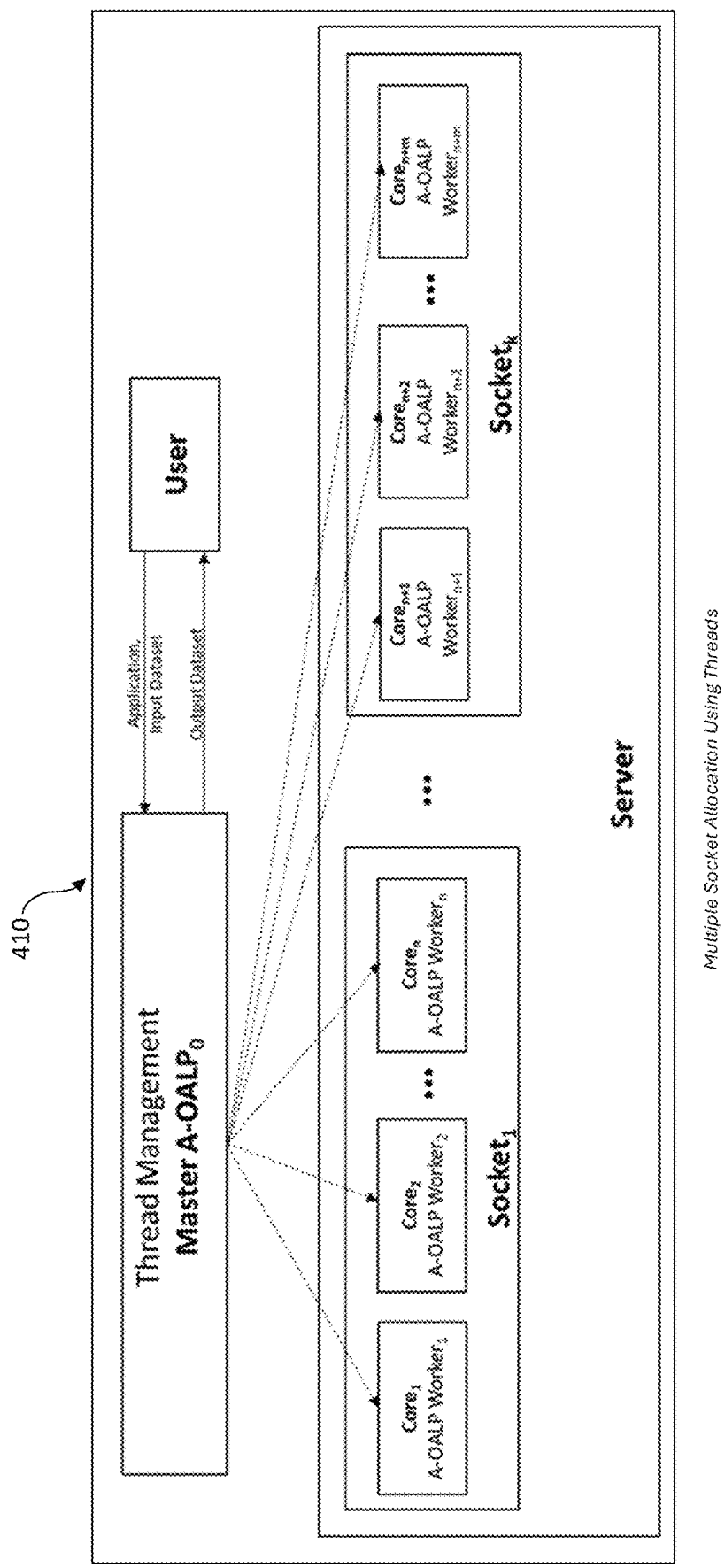
FIG. 25 is a block diagram showing the relationship between A-OALPs, processing threads, and motherboard sockets, in accordance with embodiments of the present invention.

FIG. 25 shows a block diagram 410 with examples of the relationship between a thread manager managing multiple threads with each thread representing a single core. The cores are grouped by processor socket with multiple sockets in the same server.

Figure 26:
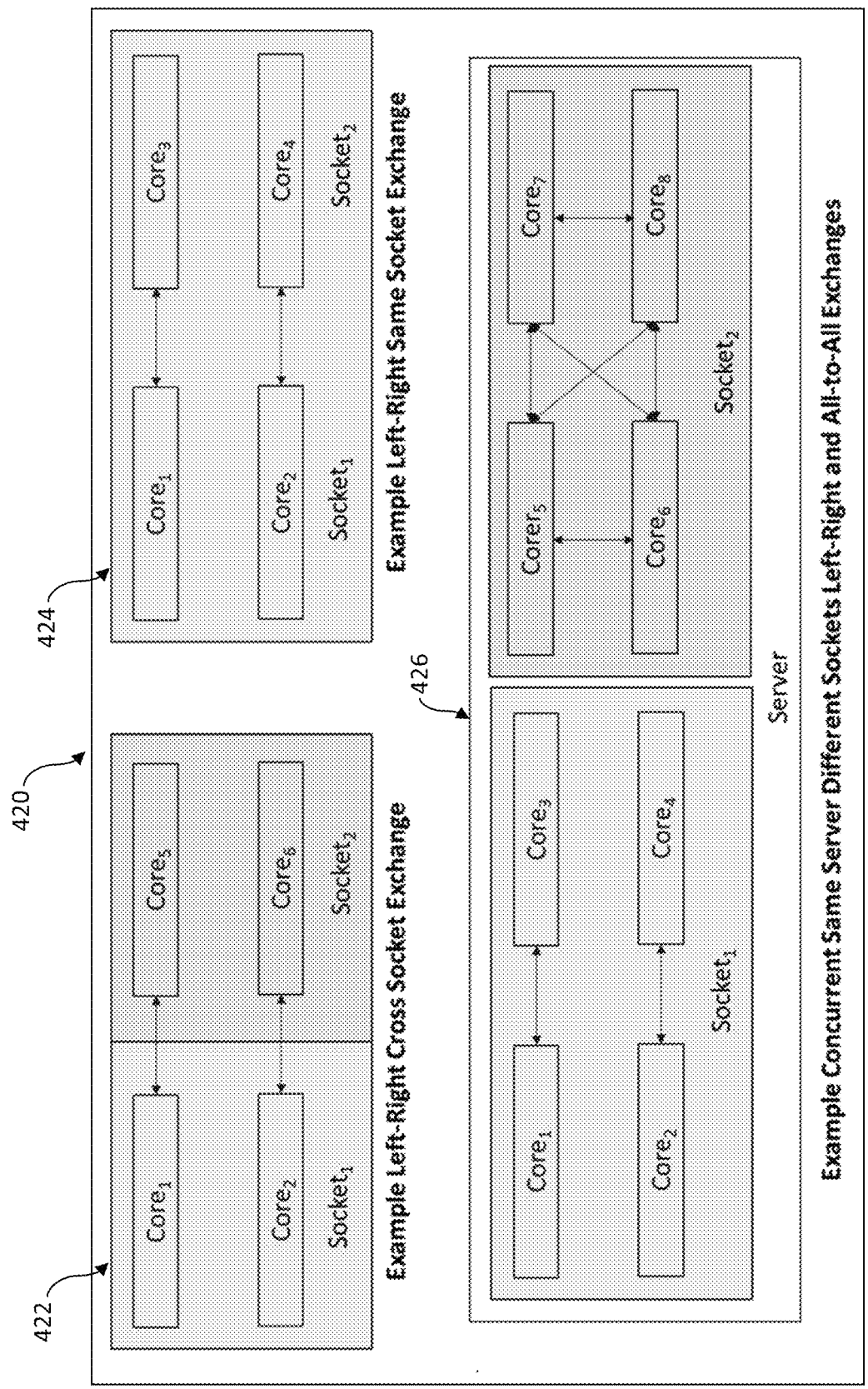
FIG. 26 is a block diagram showing multi-socket cross-communication examples, in accordance with embodiments of the present invention.

FIG. 26 shows multiple diagrams 420 depicting socket-based communication. The first example 422 shows a left-right exchange across two processor sockets using the shared memory as the medium of exchange. The second example 424 shows the same left-right exchange but rather than being across two processor sockets is, instead, within a single processor socket, making this exchange equivalent to a standard shared memory exchange model. The third example 426 shows that it is possible to have different communication exchange models executing concurrently, each on a different socket of the same server. This example simplifies the manageability of multiple concurrent tasks as each task's exchange can be separated by the socket used, thus directly reducing the multicore communication complexity.

Methods of the present invention can provide and facilitate optimization of software or one or more algorithms, with various methods comprising receiving the software or the one or more algorithms, and test data, from an operator; decomposing the software or the one or more algorithms into one or more executable and analyzable advanced output-affecting linear pathways A-OALPs, wherein each of the one or more A-OALPs includes runtime information generation for one or more instances; and executing an A-OALP hardware controller to: receive one or more input variable attribute values; compare the one or more input variable attribute values that correspond to a pathway selection entry in an A-OALP selection table, wherein the A-OALP selection table uses the one or more input variable attribute values and certain value ranges; select at least one A-OALP that corresponds to the pathway selection; identify the selected at least one A-OALP for further execution; determine which of the one or more input variable attribute values vary a processing time of the selected at least one A-OALP; determine which of the one or more input variable attribute values vary memory allocation of the selected at least one A-OALP; and determine a maximum number of parallel cores usable by the selected at least one A-OALP for a current one or more input variable attribute values.

In various embodiments, the method further comprises determining a maximum number of parallel cores usable by the selected at least one A-OALP for a currently available number of cores or a user-indicated maximum number of cores.

In various embodiments, the method further comprises optimizing energy consumption or processing performance for executing the software or one or more algorithms using the selected at least one A-OALP.

In various embodiments, at least one of cost, water use, and carbon footprint data is converted into either the energy consumption or the processing performance.

In various embodiments, the method further comprises executing in parallel more than one A-OALP on multiple separate servers while concurrently executing in parallel multiple instances of each of the more than one A-OALP on multiple separate cores of an A-OALP server.

In various embodiments, the method further comprises generating a temporal profile for each of the one or more A-OALPs using the one or more input variable attribute values that vary processing time.

In various embodiments, the method further comprises generating an advanced time prediction curve fit for each A-OALP of the one or more A-OALPS using the temporal profile.

In various embodiments, the method further comprises generating an advanced speedup prediction curve fit for each A-OALP of the one or more A-OALPs using a scaled version of the temporal profile.

In various embodiments, the method further comprises generating a spatial profile for each of the one or more A-OALPs, using one or more variable attribute values that affect the memory allocation.

In various embodiments, the method further comprises generating an advanced space complexity curve fit for each A-OALP of the one or more A-OALPs using the spatial profile.

In various embodiments, the method further comprises generating an advanced freeup prediction curve fit for each A-OALP of the one or more A-OALPs using a scaled version of the spatial profile.

In various embodiments, the method further comprises automatically constructing and using one or more persistent thread pools with persistent A-OALPs to remove thread construction, thread destruction, thread pool construction, or thread pool destruction overhead.

In various embodiments, the method further comprises linking one or more particular physical processing cores to one or more particular processing threads.

In various embodiments, the method further comprises limiting A-OALP cross-communication to one or more cores on a server and eliminating a need for A-OALP cross-communication between multiple servers.

In various embodiments, the method further comprises performing super-linear processing from A-OALP-based dynamic all-loop unrolling parallelization.

In various embodiments, the method further comprises performing dynamic loop unrolling on at least one of the one or more A-OALPs to determine multiple instances of the at least one of the one or more A-OALPs.

In various embodiments, the method further comprises increasing code performance by removing extraneous code for task-like parallelism.

In various embodiments, the method further comprises facilitating cross communication between multiple addressable hardware socket components.

In various embodiments, the multiple addressable hardware socket components comprise multiple processing cores.

In one or more embodiments from the perspective of a system of optimization of software or one or more algorithms, one or more computing devices comprise a program code stored in memory, with a processor configured to execute the program code to: (i) receive the software or the one or more algorithms, and test data, from an operator; (ii) decompose the software or the one or more algorithms into one or more executable and analyzable advanced output-affecting linear pathways A-OALPs, wherein each of the one or more A-OALPs includes runtime information generation for one or more instances; and (iii) execute an A-OALP hardware controller to: receive one or more input variable attribute values; compare the one or more input variable attribute values that correspond to a pathway selection entry in an A-OALP selection table, wherein the A-OALP selection table uses the one or more input variable attribute values and certain value ranges; select at least one A-OALP that corresponds to the pathway selection; identify the selected at least one A-OALP for further execution; determine which of the one or more input variable attribute values vary a processing time of the selected at least one A-OALP; determine which of the one or more input variable attribute values vary memory allocation of the selected at least one A-OALP; and determine a maximum number of parallel cores usable by the selected at least one A-OALP for a current one or more input variable attribute values. Moreover, the processor can execute the program code to perform all of the described actions, steps, and methods described above, below, or otherwise herein.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

It will be recognized by one skilled in the art that operations, functions, algorithms, logic, method steps, routines, sub-routines, and modules may be implemented in software, in firmware, in special purpose digital logic, and any combination thereof without deviating from the spirit and scope of the present invention as recited within the claims attached hereto.

The present invention may be embodied in other specific forms without departing from the spirit or essential attributes thereof, and it is, therefore, desired that the present embodiment be considered in all respects as illustrative and not restrictive. Similarly, the above-described methods, steps, apparatuses, and techniques for providing and using the present invention are illustrative processes and are not intended to be limited to those specifically defined herein. Further, features and aspects, in whole or in part, of the various embodiments described herein can be combined to form additional embodiments within the scope of the invention even if such combination is not specifically described herein.

While the methods, steps, and processing described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A method for optimization of software or one or more algorithms, comprising:
    receiving the software or the one or more algorithms, and test data, from an operator;
    decomposing the software or the one or more algorithms into one or more executable and analyzable advanced output-affecting linear pathways (A-OALPs), wherein each of the one or more A-OALPs includes runtime information generation for one or more instances;
    executing an A-OALP hardware controller to:
        receive one or more input variable attribute values;
        compare the one or more input variable attribute values that correspond to a pathway selection entry in an A-OALP selection table, wherein the A-OALP selection table uses the one or more input variable attribute values and certain value ranges;
        select at least one A-OALP that corresponds to the pathway selection;
        identify the selected at least one A-OALP for further execution;
        determine which of the one or more input variable attribute values vary a processing time of the selected at least one A-OALP;
        determine which of the one or more input variable attribute values vary memory allocation of the selected at least one A-OALP; and
        determine a maximum number of parallel cores usable by the selected at least one A-OALP for a current one or more input variable attribute values;
    executing in parallel multiple A-OALPs on multiple separate servers while concurrently executing in parallel multiple instances of each of the multiple A-OALPs on multiple separate cores of a server; and
    limiting A-OALP cross-communication to multiple cores on the server and eliminating a need for A-OALP cross-communication between the multiple separate servers.

2. The method of claim 1, further comprising determining a maximum number of parallel cores usable by the selected at least one A-OALP for a currently available number of cores or a user-indicated maximum number of cores.

3. The method of claim 1, further comprising optimizing energy consumption or processing performance for executing the software or one or more algorithms using the selected at least one A-OALP.

4. The method of claim 3, wherein at least one of cost, water use, and carbon footprint data is converted into either the energy consumption or the processing performance.

5. The method of claim 1, further comprising generating a temporal profile for each of the one or more A-OALPs using the one or more input variable attribute values that vary processing time.

6. The method of claim 5, further comprising generating an advanced time prediction curve fit for each A-OALP of the one or more A-OALPS using the temporal profile.

7. The method of claim 5, further comprising generating an advanced speedup prediction curve fit for each A-OALP of the one or more A-OALPs using a scaled version of the temporal profile.

8. The method of claim 1, further comprising generating a spatial profile for each of the one or more A-OALPs, using one or more variable attribute values that affect the memory allocation.

9. The method of claim 8, further comprising generating an advanced space complexity curve fit for each A-OALP of the one or more A-OALPs using the spatial profile.

10. The method of claim 8, further comprising generating an advanced freeup prediction curve fit for each A-OALP of the one or more A-OALPs using a scaled version of the spatial profile.

11. The method of claim 1, further comprising automatically constructing and using one or more persistent thread pools with persistent A-OALPs to remove thread construction, thread destruction, thread pool construction, or thread pool destruction overhead.

12. The method of claim 11, further comprising linking one or more particular physical processing cores to one or more particular processing threads.

13. The method of claim 1, further comprising performing super-linear processing from A-OALP-based dynamic all-loop unrolling parallelization.

14. The method of claim 1, further comprising performing dynamic loop unrolling on at least one of the one or more A-OALPs to determine multiple instances of the at least one of the one or more A-OALPs.

15. The method of claim 1, further comprising increasing code performance by removing extraneous code for task-like parallelism.

16. The method of claim 1, further comprising facilitating cross communication between multiple addressable hardware socket components.

17. The method of claim 16, wherein each of the multiple addressable hardware socket components comprise multiple processing cores.

18. A system for optimization of software or one or more algorithms, comprising:
    a memory; and
    a processor operatively coupled with the memory, wherein the processor is configured to execute a program code to:
        receive the software or the one or more algorithms, and test data, from an operator;
        decompose the software or the one or more algorithms into one or more executable and analyzable advanced output-affecting linear pathways (A-OALPs), wherein each of the one or more A-OALPs includes runtime information generation for one or more instances;
        execute an A-OALP hardware controller to:
            receive one or more input variable attribute values;
            compare the one or more input variable attribute values that correspond to a pathway selection entry in an A-OALP selection table, wherein the A-OALP selection table uses the one or more input variable attribute values and certain value ranges;
            select at least one A-OALP that corresponds to the pathway selection;
            identify the selected at least one A-OALP for further execution;
            determine which of the one or more input variable attribute values vary a processing time of the selected at least one A-OALP;
            determine which of the one or more input variable attribute values vary memory allocation of the selected at least one A-OALP; and
            determine a maximum number of parallel cores usable by the selected at least one A-OALP for a current one or more input variable attribute values;
        executing in parallel multiple A-OALPs on multiple separate servers while concurrently executing in parallel multiple instances of each of the multiple A-OALPs on multiple separate cores of a server; and limiting A-OALP cross-communication to multiple cores on the server and eliminating a need for A-OALP cross-communication between the multiple separate servers.

\* \* \* \* \*